United States Patent [19]

Miller

[11] 4,234,897
[45] Nov. 18, 1980

[54] DC FREE ENCODING FOR DATA TRANSMISSION

[75] Inventor: Jerry W. Miller, Menlo Park, Calif.

[73] Assignee: Ampex Corporation, Redwood City, Calif.

[21] Appl. No.: 948,725

[22] Filed: Oct. 5, 1978

[51] Int. Cl.² .............................................. G11B 5/09
[52] U.S. Cl. ........................................ 360/45; 360/40
[58] Field of Search ....................... 360/39, 40, 43, 45

[56] References Cited
U.S. PATENT DOCUMENTS

| | | | |
|---|---|---|---|
| 3,810,111 | 5/1974 | Patel | 360/40 |
| 4,027,335 | 5/1977 | Miller | 360/40 |
| 4,129,888 | 12/1978 | Reinholtz | 360/40 |

Primary Examiner—Vincent P. Canney
Attorney, Agent, or Firm—Robert G. Clay

[57] ABSTRACT

A method and apparatus provide for the elimination of any net DC component from the transmission of binary data sequentially in successive clocked bit cells of a transmission channel wherein logical first bit states, e.g., 0's, are normally transmitted as signal transitions relatively early in respective bit cells, preferably at cell edge, and logical second bit states, e.g., 1's, are normally transmitted as signal transitions relatively late in respective bit cells, preferably at mid-cell, and any transition relatively early in a bit cell following a transition relatively late in the next preceding bit cell is suppressed. The onset of a sequence of second bit states following a first bit state that might introduce a DC component into the transmitted signal with normal transmission is detected by counting first bit states and producing a first indicating signal when the count is of parity indicating such sequence, and in response to the first indicating signal, a current bit and an adjacent bit the transmission of signal transitions is modified from the onset of such sequence to eliminate any DC component. Preferably, the possibly troublesome sequences are encoded by encoding pairs of second bit states by a single transition early in the first bit cell of the pair.

6 Claims, 10 Drawing Figures

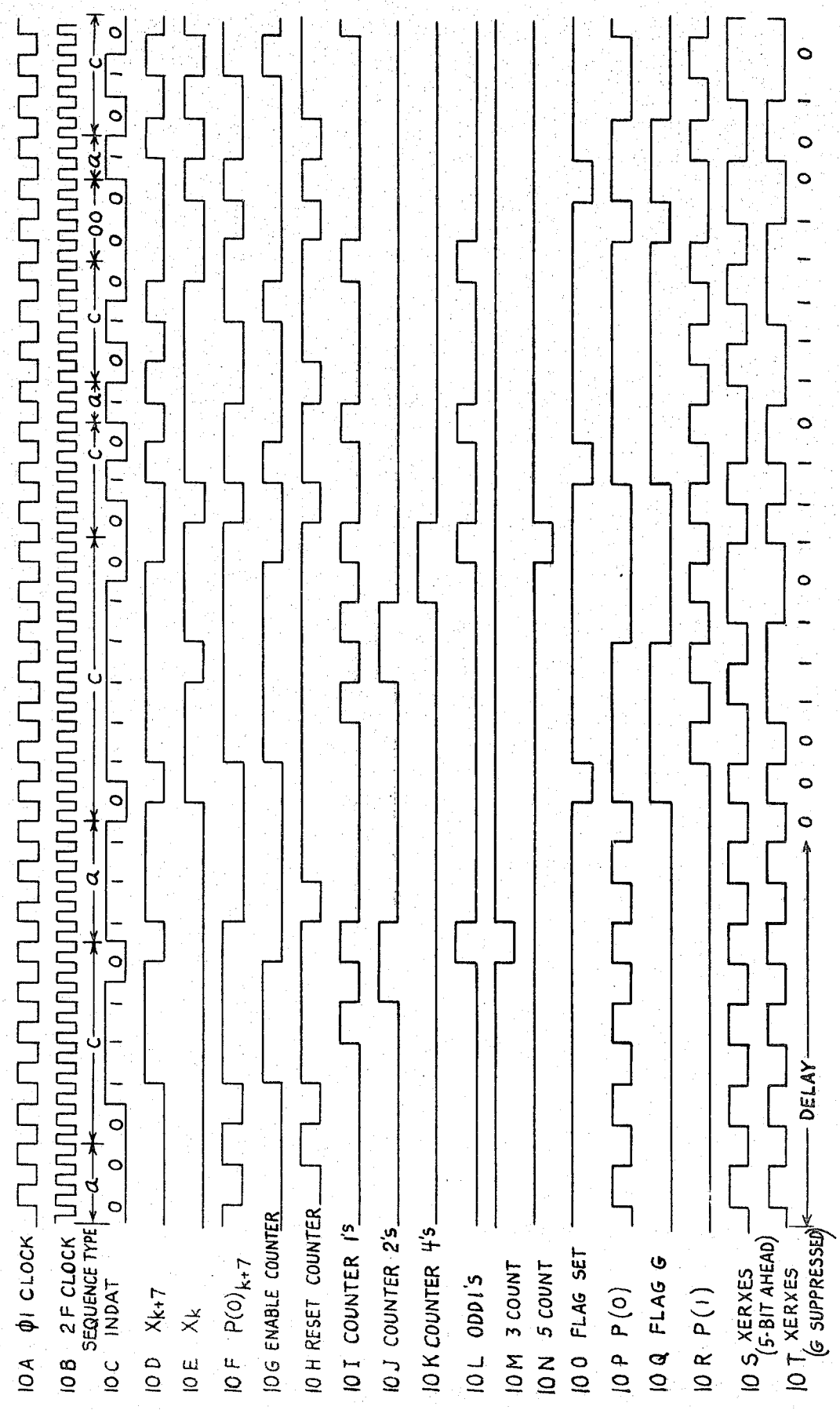

DC FREE ENCODING FOR DATA TRANSMISSION

CROSS-REFERENCE TO RELATED APPLICATION

Miller and Rudnick, Ser. No. 949,161 filed concurrently herewith, entitled "DC Free Encoding for Data Transmission Including Limited Look-Ahead Means", and assigned to the same assignee as this invention, now abandoned for a continuation thereof, application Ser. No. 131,042, filed Mar. 17, 1980 and copending therewith.

This invention relates to the transmission of data in binary form serially through an information channel. More particularly it relates to a method and system for transmitting signals that are self-clocking and still more particularly to such method and system for transmission through an information channel having no response at zero frequency. The invention relates to the encoding and decoding of particular binary codes. The invention finds particular application where the information channel comprises a magnetic tape recorder.

Data or information in binary form is comprised of data bits wherein the information in each bit is in the form of one or the other of two states. Such states are often referred to as logical "1" and logical "0". In operating with information in binary form it is necessary to recognize the respective logic states for each bit. Whether these bits are recorded on tape or are otherwise recorded or are transmitted, each bit of information may be said to be maintained in a bit cell which represents an interval in time or space containing the respective bit of information. The logic states may be recognized or referred to variously as "yes" or "no", "+" or "−", "up" or "down", and "true" or "not true", and the like. Where the information is recorded on a tape, the states may be of opposite magnetic polarization. It is also common to have one state a reference level and the other state a different level, in which case indication of the second state may be provided by a recognizable signal while the first state is indicated by absence of such signal. There is positive logic and negative logic. Further, it makes no difference for the purposes of this invention which of the two states is called "1" and which is called "0".

As noted, the present invention finds particular applicability to information channels such as magnetic recording channels which have no response at zero frequency; that is, they do not transmit at DC. In general it is desirable to record data bits as closely together as possible while producing errors so infrequently as to be tolerable. Various recording formats or binary data codes have been developed for recording binary data. Some codes desirably permit self-clocking; that is, the bit cell intervals may be identified in the recorded bit data without the need for separate timing pulses.

In information channels which do not transmit DC, binary wave forms suffer distortions of peak amplitude value and zero-crossing location which cannot be removed by means of linear response compensation networks unless the channel affords substantial response at frequencies at least as great as the bit rate. These distortions are commonly described as baseline wander and act to reduce the effective signal-to-noise ratio and thus degrade the reliability of detection of the recorded signals.

A common transmission format or data code is that utilized in the recording and reproducing system disclosed in Miller U.S. Pat. No. 3,108,261, issued Oct. 22, 1963 for Recording and/or Reproducing System. In the Miller Code, locigal 1's are represented by signal transitions at a particular location in the respective bit cells, specifically at midcell, and logical 0's are represented by signal transitions at a different particular location in the respective cells, specifically at the beginning or leading edge of each bit cell. The Miller format involves the suppression of any transition occurring at the beginning of one bit interval following an interval containing a transition at its center. A difficulty arises from the asymmetry of the waveform generated by these rules, for it introduces DC into the information channel.

A code based upon the Miller code but with the DC component eliminated is described by A. M. Patel in "Zero-Modulation Encoding in Magnetic Recording", IBM J. Res. Develop., Vol. 19, No. 4, July 1975. Such format, commonly called ZM, is based upon the Miller format for most input sequences but sequences of the form 0111—110 having an even number of 1's are coded by special rules. While this code eliminates the DC content in the encoded waveform, it does so at the expense of requiring that each sequence to be specially coded be recognized in advance of encoding any part of the sequence. This requirement for look-ahead sequence scanning implies a coding delay (and coder memory) nearly as long as the longest possible sequence of the indicated type. To avoid requiring "infinite" memory, the Patel system provides for dividing input sequences periodically by inserting additional suitably chosen parity bits. Practically this requires a rate change to accommodate the inserted bits. Further the bits necessarily occupy some of the space available for recording.

Another code based upon the Miller code with the DC component eliminated is described in Miller U.S. Pat. No. 4,027,335, issued May 31, 1977 for DC Free Encoding for Data Transmission System. Such format, sometimes called Miller-Miller, Miller$^2$ or Miller-squared, is also based upon the original Miller format for most input sequences, and sequences that would introduce a DC component are coded by special rules. However, in the Miller$^2$ format it is unnecessary to look forward more than one bit interval, and, hence, long memory and extra parity bits are not required. In the Miller$^2$ format, it is noted at the beginning of a sequence of 1's whether or not the sequence might be of the sort that produces a DC component and if, upon reaching the end of such sequence, it is found that the sequence indeed would produce a DC component under the regular Miller format, the encoding is modified to drop the transition that would have caused DC imbalance.

The format of the present invention is also based upon the basic Miller code and is an alternative to the Miller$^2$ format in that it, too, eliminates any DC component without requiring a long memory or extra parity bits. In accordance with the present invention, it is also noted at the beginning of a sequence of 1's whether or not the sequence might be of the sort that produces a DC component, but instead of waiting to see how the sequence turns out, the encoding is modified at the onset of the sequence of 1's to correct any possible imbalance. The encoding is then modified at the end of the sequence of 1's as necessary to return to the regular Miller format without introducing DC.

In accordance with the present invention a binary input data stream of rate 1/T bits per second is encoded into a binary waveform having a minimum interval between transitions of T seconds, a maximum between transistions of 2.5 T seconds, no DC content, and a maximum value for the running integral of the waveform of 1.5 T seconds times half the magnitude of a transition. The encoding procedure requires no rate change and need entail an encoding delay of only 2 T seconds. Decoding need require inspection of no more than 2.5 successive bit intervals; hence limiting the propagation of erros. The format utilized in the present invention is an alternative to the Miller$^2$ format, and like Miller$^2$ achieves the high frequency response requirements of the Miller code with the DC-free characteristic of the ZM code without the rate change and added redundancy of the latter and without requiring long memory. The present format is an improvement over Miller$^2$ in producing no more than 2.5 T between transitions, Miller$^2$ producing up to 3 T between transitions. A further improvement of the present format is the cancellation of any accumulated DC charge sooner in many cases than in the Miller$^2$ format and in no case later. Thus, the low frequency content of this format is less than that in the Miller$^2$ format.

Like the Miller$^2$ format, the format of the present invention may be characterized as a DC-free, self-clocking, non-return-to-zero format or DCF-SC-NRZ. It is sometimes referred to as the Xerxes format. Thus a primary object of the present invention is to provide a system and method for transmitting binary data serially over an information channel incapable of transmitting DC, although of course the system and method can be used with information channels having DC capability. It is a further object of the invention to provide such system and method where the data are transmitted in self-clocking form. It is still another object of the invention to provide such system and method without the need for rate change or large memory. A still further object of the invention is to provide such system and method without as long a maximum time between transitions as is permitted by the Miller$^2$ format. Yet another object of this invention is to provide such system and method that balances any accumulated charge sooner in many cases and in no case later than in the Miller$^2$ format.

Other objects and advantages of the invention will become clear from the following detailed description, particularly when taken in conjunction with the appended drawings in which.

Figure 3:
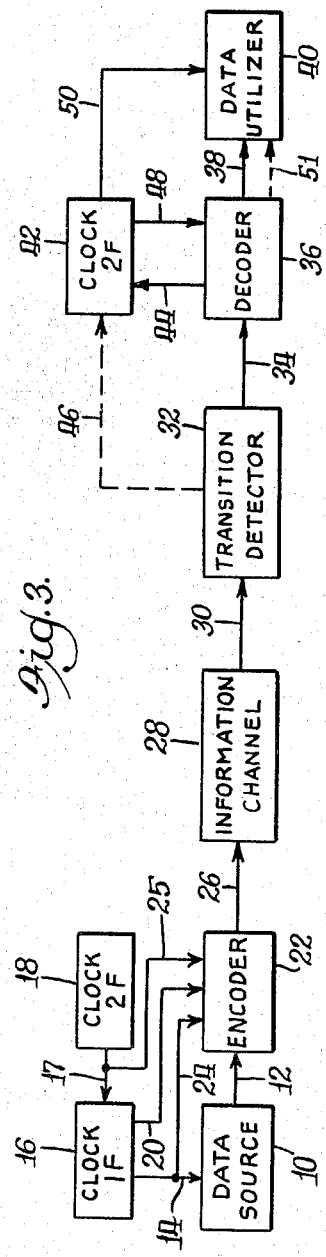
FIG. 3 is a block diagram of the system of the present invention.
Figure 6:
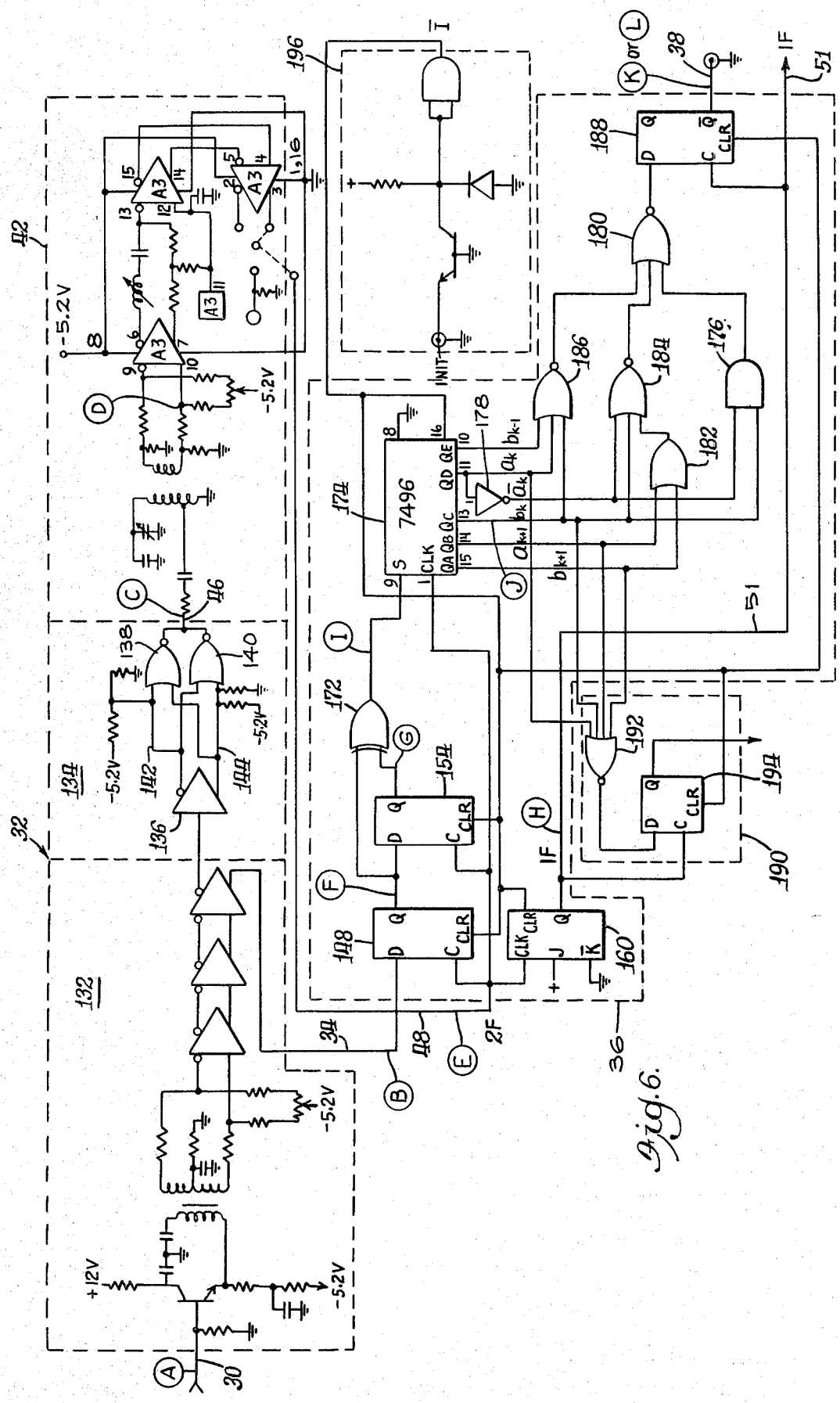
FIG. 6 is a schematic diagram illustrating one form of decoder and one form of transition detector and 2F clock useful in the system illustrated in FIG. 3.
Figure 7:
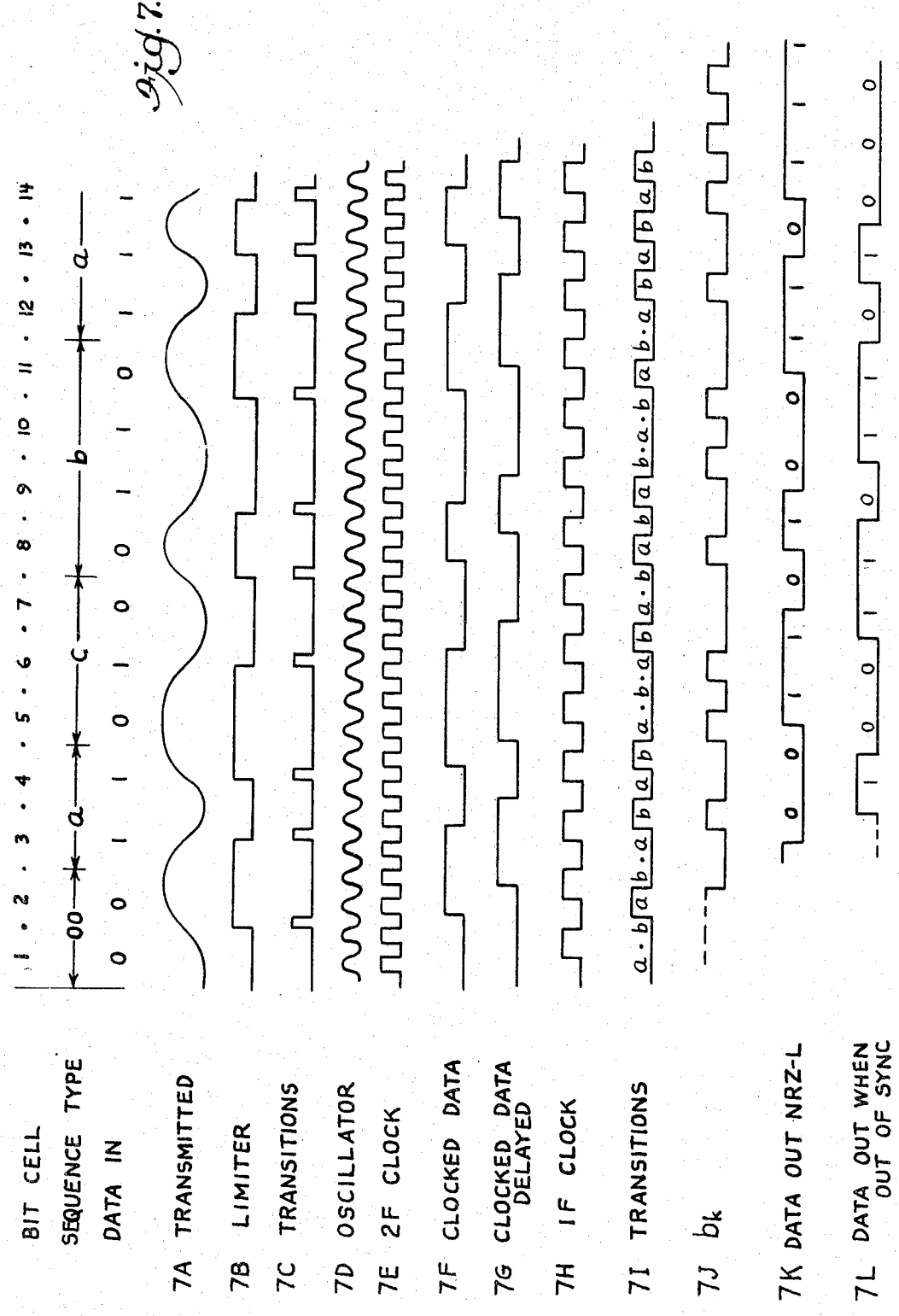
Figure 8:
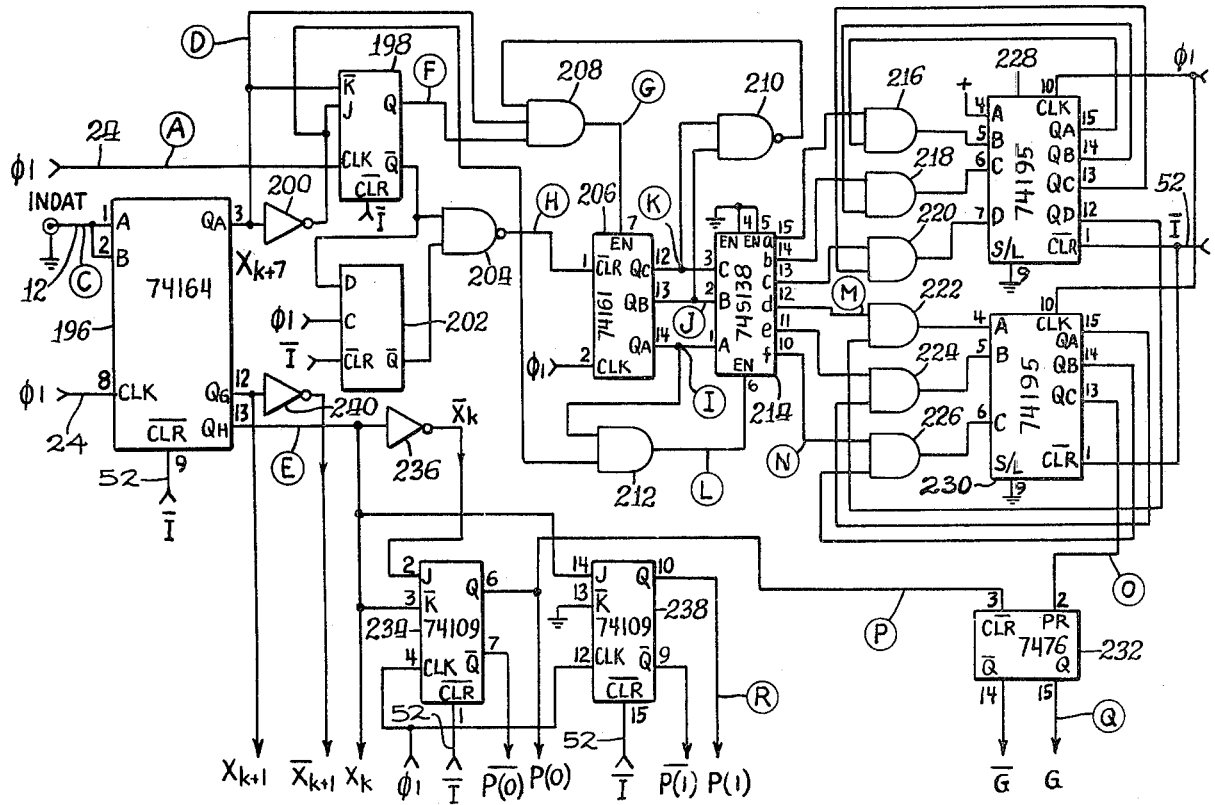
Figure 9:
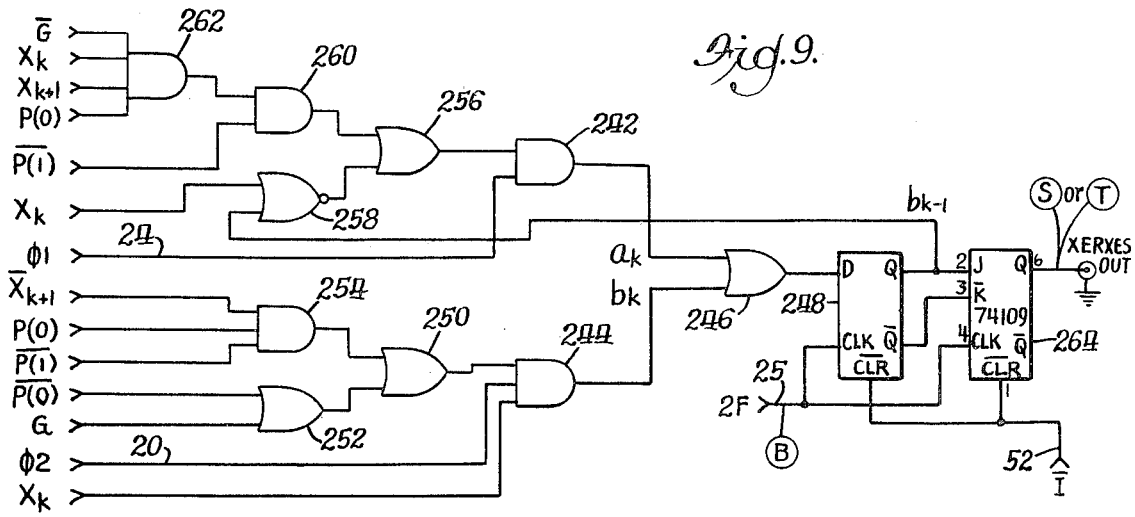

FIG. 7, including 7A–7L, is a timing diagram illustrating the operation of the circuit of FIG. 6;

FIG. 8 is a schematic diagram illustrating look-ahead circuitry for another form of encoder useful in the system illustrated in FIG. 3;

FIG. 9 is a schematic diagram illustrating encoding circuitry useful with the circuitry shown in FIG. 8; and FIG. 10, including A–T, is a timing diagram illustrating the operation of the circuits of FIGS. 8 and 9.

Figure 1:
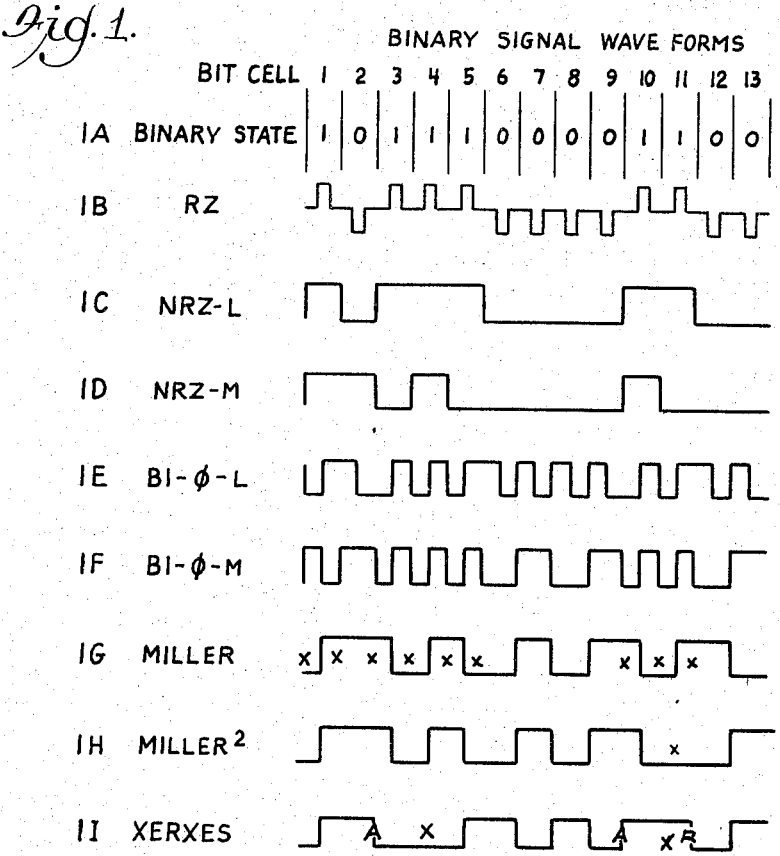
FIG. 1 illustrates a number of binary signal waveforms including those following the format according to the present invention and various formats of the prior art.

For an understanding of the present invention and its advantages, it will be helpful to consider various binary data formats utilized previously. In FIG. 1 there are illustrated a number of binary signal waveforms useful in transmitting or recording information serially in binary form. Waveform II utilizes the format of one form of the present invention. The waveforms of FIG. 1 are divided into bit cells with each cell containing a bit of data in binary form; that is, in each cell the binary information is in either state 1 or state 0. By way of example, FIG. 1A indicates the binary state of the information in a number of successive bit cells. This same information is contained in various forms in the respective waveforms.

FIG. 1B illustrates a waveform following a return-to-zero (RZ) format wherein 1's are indicated by upward or positive levels and 0's are indicated by downward or negative levels, with the signal returning to a central or zero level between cells.

A more commonly used format is the non-return-to-zero (NRZ) data code utilized by the waveforms shown in FIGS. 1C and 1D. The waveform of FIG. 1C, NRZ-L, corresponds to the waveform of FIG. 1B, RZ, without the return to zero between bit cells. In this code, the signal remains at a 1 level or state for the entire cell containing a 1 bit and goes to the 0 level or state where there is a 0 bit in the bit cell. Thus, there are transitions only when successive bit cells are in different states. In the waveform illustrated in FIG. 1D, NRZ-M, the code is a non-return-to-zero-mark code wherein each logical 1 is indicated by a transition between the two levels while a logical 0 is indicated by the absence of such transition. The difficulty with both of the NRZ codes is the very large possibility of timing errors, as the signal may remain in one state or the other for relatively long periods. It is therefore helpful to use self-clocking codes.

The waveforms illustrated in FIGS. 1E and 1F follow so-called Manchester codes, also known as bi-phase-level (BI-$\phi$-L) and bi-phase-mark (BI-$\phi$-M), respectively. In the bi-phase-level code of FIG. 1E, the state of the bit is indicated by the direction of the transition in the middle of a bit cell. As shown in FIG. 1E, a transition upward at midcell indicates a logical 1, and a transition downward at midcell indicates a logical 0. In the bi-phase-mark code of FIG. 1F, a logical 1 is shown by a transition, either upward or downward, at midcell, while a logical 0 is indicated by absence of any transition at mid-cell. Self-clocking of the bi-phase-level signal is achieved by utilization of the mid-cell transitions in each bit cell. Self-clocking of the bi-phase-mark signal is achieved by introducing a transition at the beginning of each bit cell. While the Manchester codes do not require a DC transmission capability, the addition of so many additional transitions materially increases the required bandwidth.

A waveform following the format utilized in Miller U.S. Pat. No. 3,108,261 is illustrated in FIG. 1G. As in the bi-phase-mark code, logical 1's are indicated by transitions in mid-cell, and logical 0's are indicated by the absence of such transitions. In the Miller format, however, there are no timing transitions at the beginning of bit cells containing locigal 1's, and transitions are suppressed where they would otherwise occur at the beginning of respective bit cells following the respective mid-cell transition. In the basic Miller code this means that there is a transition at mid-cell for each logical 1 and at the beginning of each cell for each logical 0 except for the case when a logical 0 follows a logical 1. The suppressed transitions are indicated by X's on the waveform of FIG. 1G. While the Miller code requires only the smaller bandwidth of the NRZ code and provides the self-clocking feature of the Manchester codes, it is not entirely free of DC. Certain sequences of logical 1's and 0's may unbalance the waveform following the Miller code. For example, in the waveform illustrated in FIG. 1G, the suppression of the transition between cells 11 and 12 may add a DC component that is not subsequently offset by suppression of an oppositely directed transition. If similar sequences are repeated, the DC component will grow, as will be described in greater detail below in respect to FIG. 2.

A waveform following the Miller$^2$ format eliminates the DC component by suppressing another, but oppositely directed, transition. In accordance with the Miller$^2$ format, it is a transition that can be subsequently identified as having been suppressed by reason of the particular rules defining the format. More particularly, in accordance with a specific form of Miller$^2$, the next preceding transition is suppressed as indicated by an X on the waveform of FIG. 1H, this being the mid-cell transition in bit cell 11.

A waveform following the Xerxes format is illustrated in FIG. 1I. The Xerxes format eliminates the DC component by restoring the transition suppressed in the Miller format in sequences where it would otherwise produce a DC component, as indicated by the transition marked by R in FIG. 1I. Rather, it takes care of signal imbalance by encoding certain pairs of 1's as a single edge-cell transition at the beginning of the cell corresponding to the first 1 of the pair, as indicated by the transitions marked A in FIG. 1I, the transition in the cell corresponding to the second 1 of the pair being suppressed, as indicated by an X in FIG. 1I.

Figure 2:
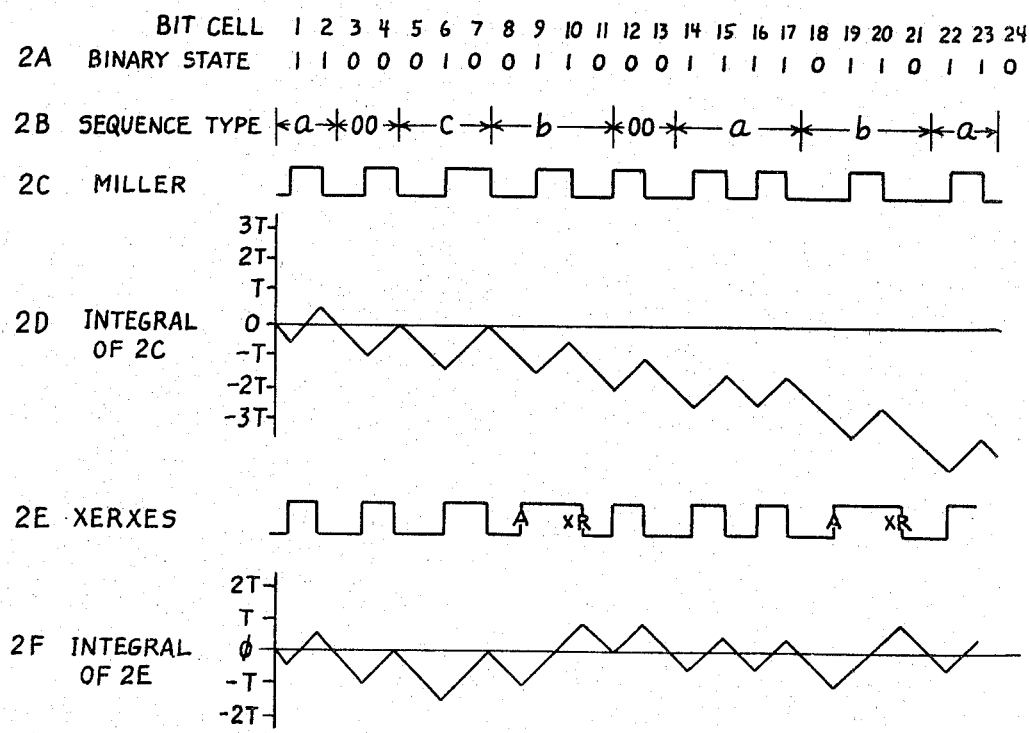
FIG. 2 shows comparative waveforms utilizing the Miller format and a format according to the present invention together with comparisons of the integrals of the transmitted signals.

An understanding of how the DC problem arises from use of the Miller code and how the problem is overcome by the use of the present invention will be facilitated by reference to FIG. 2. In the Miller code, the bits are identified by the phase of transition in level. With one exception, the 0 bits are identified by transitions in a relatively early part of a bit cell; whereas 1 bits are identified by transitions relatively late in the bit cell. More specifically, in the illustrated waveforms, 0 bits are identified by transitions at the beginning of the cell, and 1 bits are identified by transitions at mid-cell. The one exception is that transitions are suppressed that would occur within one bit cell of any prior transition. The effect of this is to suppress transitions identifying a 0 bit following a 1 bit.

Referring to FIG. 2, in FIG. 2A is indicated by way of example the binary state of successive bit cells in a data stream. FIG. 2B indicates the type of various sequences identified below. The waveform of FIG. 2C is a waveform of a signal identifying the bits of such data stream in accordance with the Miller format. FIG. 2D represents the integral of the waveform of FIG. 2C relative to the level of the mid-point of a transition. The transitions go one unit above and one unit below this mid-level. The length of each bit cell is time T. It may be noted that the integral returns to zero after each cycle of the Miller signal through bit cell 7. Thereafter, the integral remains negative, subsequently becoming more and more negative. This introduces the DC component previously mentioned, leading to errors where there is no DC transmission capability in the information channel, as in magnetic recording.

Reflection on the waveform of FIG. 2C for the particular example of a data stream will reveal why this is so. For each bit cell containing a 1 bit the signal is balanced above and below the mid-level, making no net change in the integral. When the levels for successive 0 bits are in opposite directions, again the signal is balanced, making no net change in the integral. When successive 0 bits are separated by an odd number of 1 bits, the signal levels in the respective 0 bit cells are in opposite directions, and again the signal is balanced. A problem arises only where 0 bits are separated by an even number of 1 bits. In that case, the signal levels in the 0 bit cells are in the same direction, resulting in a net accumulated area under the curve and a net displacement of the integral from zero. Each time there is a sequence of data in which two 0 bits are spaced by an even number of 1 bits, there is a net displacement of the integral. Of course, the displacement can be in either direction, and some of the time the displacement will return the integral toward zero. However, it is also possible that the areas accumulate, as shown in the example of FIG. 2D.

The problem is obviously created by the suppression of the transition at the beginning of a 0 state following a succession of an even number of 1 states, making the signal asymmetrical. The solution to the problem, in accordance with the present invention is not to suppress certain 1's transitions in addition to that transition, as in Miller$^2$, but rather to encode certain pairs of 1's by a single transition at the beginning of each pair, the result being that illustrated by the waveform of FIG. 2E, where each restored transition is indicated by an R, each edge cell transition advanced to the edge of the first cell of such pair is indicated by an A, and each additionally suppressed transition is indicated by an X. As is evident from the integral of this waveform as shown in FIG. 2F, there is then no net DC component. Of course, this is possible only if the suppressed and advanced transitions can be identified by a decoder. Otherwise, the information is lost. The present invention includes a method and system for identifying these suppressed and advanced transitions.

For an understanding of how such identification is achieved, the input data stream may be viewed as the concatenation of sequences of four types:

(a) a series of 1's; (b) a series of 1's with a 0 at each end where the number of 1's is even; (c) a series of 1's with a 0 at each end where the number of 1's is odd; and (00) a pair of 0's. In this embodiment the number of 0's from the beginning of transmission is counted. If the number of 0's at the onset of a series of 1's is even, the sequence is of type (a) and can present no DC problem; it may be encoded and decoded in accordance with the format of Miller U.S. Pat. No. 3,108,261. It may be also noted that two successive 0's not part of a sequence of type (a), (b) or (c) are in sequence (00) and also leave the signal in balance. It is when the count of 0's prior to a series of 1's is odd that the 0 becomes part of a sequence (b) or (c) and may present a problem if the number of 1's in the sequence turns out to be even, sequence (b). Thus, at the onset of a sequence, an indicator indicates whether or not the sequence of 1's may present a problem. The encoder includes means for looking one bit cell ahead. If it is indicated that the sequence begins with a 0 and hence may present a problem, and upon encoding the first 1 it is noted by looking ahead that the next bit is 1, the encoder immediately acts to correct for possible imbalance by advancing the mid-cell transition that would occur for the first 1 in the series and produces a transition (A) at the front edge of the first 1 bit cell. The transition (X) is suppressed for the second of the two 1 bits. When the encoder seeks to encode the third bit, it looks to the succeeding fourth bit and again determines whether or not there is a pair of 1 bits. If so, the encoder proceeds as before to provide a transition at the beginning of the first of the two 1 bits and suppresses any transition for the second of the 1 bits. Whenever the sequence reaches a 0, if the number of 1 bits is even, indicating the sequence to be of type (b), the following 0 is encoded by an edge-cell transition at the beginning of the bit. That is, the transition (R) is not suppressed, as it does not follow a mid-cell transition. Examples of such encoding for sequences of type (b) appear in FIG. 1I, bit cells 9–12, and FIG. 2E, bit cells 8–11 and 18–21.

With this encoding any even number of 1 bits bounded by 0 bits that are part of the sequence produces no DC component. On the other hand, when a series of 1 bits in a sequence of the type beginning with a 0 is encoded in accordance with this format and the encoder reaches the point of encoding a final 1 that is not part of a pair of ones, but rather is followed by the 0 ending the sequence and indicating the sequence to be of type (c), that 1 is encoded by a mid-cell transition and the transition for the following 0 bit is suppressed as in the regular Miller format, again leaving the signal with no net DC component. Examples of such encoding for sequences of type (c) appear in FIG. 1I, bit cells 2–6, and FIG. 2F, bit cells 5–7.

As explained above, if the Miller format is applied to these four sequence types, (a), (b), (c) or (00), the integral of the resulting waveform for sequence types (a), (c) or (00) always reaches zero at the end of the sequence. It is only the integral of the waveform for sequence type (b) that does not. Rather it reaches a value of ±2T, the sign depending on the sense of the last transition preceding the sequence. Further, if a sequence of type (b) is followed, after certain combinations of other sequence types, by another sequence of type (b), the integral of the concatenation of sequences may grow. For some choices of concatenated sequences, the running integral grows without bound, and this is the situation which yields DC content in the waveform, as illustrated by the waveform of FIG. 2D.

The present invention involves recognition of a sequence of type (b) and encoding it in a way eliminating any DC component. According to the present invention, sequences of types (a) and (00) are encoded according to the Miller format, and sequences of type (b) and (c) are encoded according to the special Xerxes rules. Sequences of types (a) and (00) are distinguished from sequences of types (b) and (c) by maintaiing a count modulo-2 of logical 0's from the beginning of encoding. The distinction is based on the fact that all sequences have an even number of 0's. Sequences of type (a) have no 0's. Sequences of type (00) consist of two 0's. Sequences of types (b) and (c), consisting of 1's bounded by a 0 at each end, have two 0's. Thus, if the 0 count is even when a 1 appears for encoding, the sequence is of type (a). On the other hand, if the 0 count is odd when a 1 appears for encoding, the sequence is of type (b) or (c).

Of course, a sequence of type (b) cannot be distinquished from a sequence of type (c) at the onset of a sequence, as the difference between the sequences is whether the count is odd or even when the sequence ends. Therefore, the special Xerxes coding is applied from the start of the 1's in such sequences, and the encoding at the ends of the respective sequences is different depending on how the count turned out. To this end a count modulo-2 of logical 1's since the last odd 0 is maintained. The 1's are encoded in pairs by a single transition (a) at the beginning of each pair until a 0 is reached, indicating the end of the sequence. When the 1-count is odd at that time, the final 1 and the terminating 0 are encoded in the usual Miller fashion. When the 1-count is even, the 0 is encoded by an edge cell transition (R), which reinstates a transition the Miller code would have suppressed, but may be said to be in accordance with Miller, as there was no mid-cell transition marking the preceding 1. The type (c) sequence in bit cells 5, 6 and 7 (FIG. 2) contains only a single one bit and is encoded by the Xerxes coding rules since the one bit cell look-ahead detects the zero bit in cell 7. Thus, the Xerxes format does have a look-ahead feature of one bit.

The Xerxes code provides a transmitted signal from which the original data can be decoded. Every mid-cell transition is decoded as 1. An edge-cell transition in a bit cell followed by a cell having no transition is decoded as a 1 in each cell. Any other edge-cell transition is decoded as a 0. Any other cell in which there is no transition is decoded as a 0. There may not be two successive cells without transitions, except upon loss of signal. That is not to say that there may not be longer intervals between transitions, for the termination of a sequence of type (c) may result in 2.5 T between transitions as shown in FIG. 1I, bit cells 3–5, where there is an edge-cell transition in cell 3, no transition in cell 4, and a mid-cell transition in cell 5. This is the longest interval permissible under the Xerxes format, absent signal loss.

The method and system of the present invention thus provide for the transmission of data in binary form over an information channel incapable of transmitting DC, the information being transmitted in self-clocking fashion. As mentioned earlier, it makes no difference which binary state is considered logical 1 and which binary state is considered logical 0. In the foregoing and following descriptions the state normally marked by mid-cell transitions is considered the 1 state, whereas the state normally indicated by edge-cell transitions is considered the 0 state. Further, the term "mid-cell transition" is used to identify a transition relatively late in a bit cell, not necessarily in the center, and the term "edge-cell transition" is used to identify a transition relatively early in a bit cell, not necessarily at the very beginning.

In FIG. 3 there is illustrated generally in block diagram form a system for encoding a data stream in serial binary bit form in accordance with the format described above, transmitting this information over an information channel, and decoding the received signals for subsequent utilization. A data source 10 provides data in binary form serially to a path 12 when clocked by clock pulses applied over a path 14 from a clock 16. The data in the data source 10 can arise from any number of origins. However they arise, the data are converted by well-known means into binary form and arranged to be clocked out serially, as by the clock pulses on the path 14.

The clock 16 produces clock pulses periodically at a frequency 1F. The clock 16 may comprise a J-K flip-flop driven by double clock pulses applied over a path 17 from a clock 18 that develops double clock pulses at a frequency 2F. The clock 18 may comprise any of a number of well-known oscillators. The clock and double clock pulses produced should have a fast rise time. Inasmuch as the transitions for signifying logical 1's and logical 0's occur at mid-cell and edge-cell or more generally at a later phase and an earlier phase, the clock 16 provides clock pulses in two phases, phase 1 ($\phi$1) and phase 2 ($\phi$2). The clock pulses may be in the form of a square wave where the phase 2 pulses are inverted phase 1 pulses. Phase 1 ($\phi$1) clock pulses are applied over the path 14 to clock the data source 10. Phase 2 ($\phi$2) clock pulses appear on a path 20.

An encoder 22 receives the data in serial form from the data source 10 over the path 12 and also receives $\phi$1 clock pulses from the path 14 by way of a path 24 and $\phi$2 clock pulses over the path 20. Double clock pulses are received from the path 17 by way of a path 25. The encoder 22 operates upon the data as received in accordance with the Xerxes format of the present invention, as described above. The encoded data are applied over a path 26 to an information channel 28 which may comprise a magnetic tape recorder where the information is recorded and later read out. The output of the information channel appears on a path 30. Transitions in the signal are noted by a transition detector 32 which produces signals on a path 34 indicative of the transitions.

A decoder 36 receives these transition signals and decodes the information back to its original or a related form and provides the decoded information over a path 38 to a data utilization circuit 40. As mentioned earlier, the signal format of the present invention provides for selfclocking. That is, the decoder 36 must be time oriented to correspond with the original $\phi$1 and $\phi$2 signals to be able to recognize when in each bit cell the transition occurred. This synchronization is achieved by utilization of a clock 42 which provides clock pulses at the double frequency 2F. To synchronize the clock, signals from the decoder may be applied over a path 44, or signals may be applied over a path 46 from the transition detector 32. In either event, appropriate timing signals are applied to the data utilization circuit 40; they may be applied directly from the clock 42 over a path 50 or indirectly through the decoder 36 over a path 51. It may be noted that a path may comprise a plurality of conductors.

Figure 4:
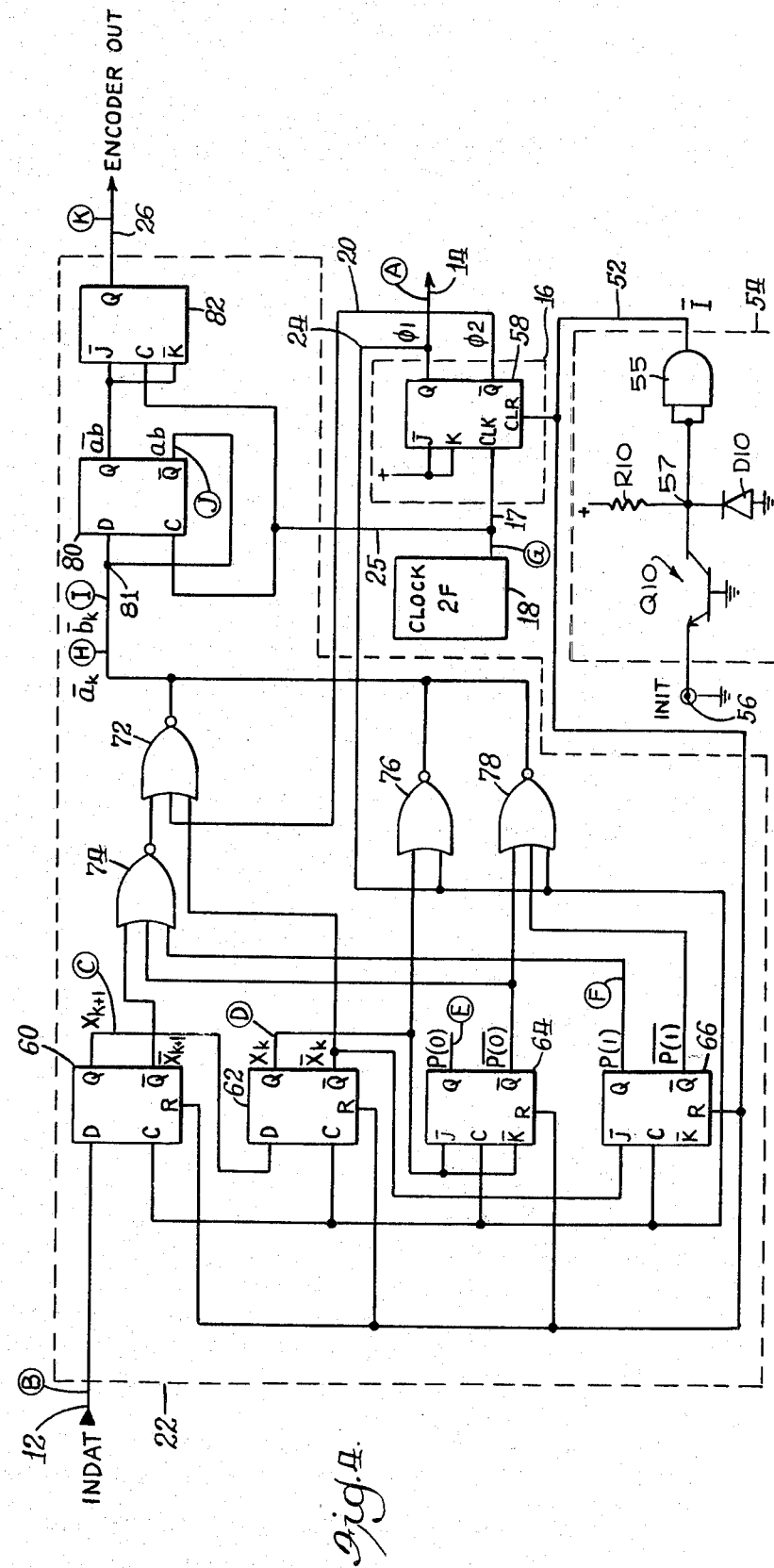
FIG. 4 is a schematic diagram of one form of encoder useful in the system shown in FIG. 3.
Figure 5:
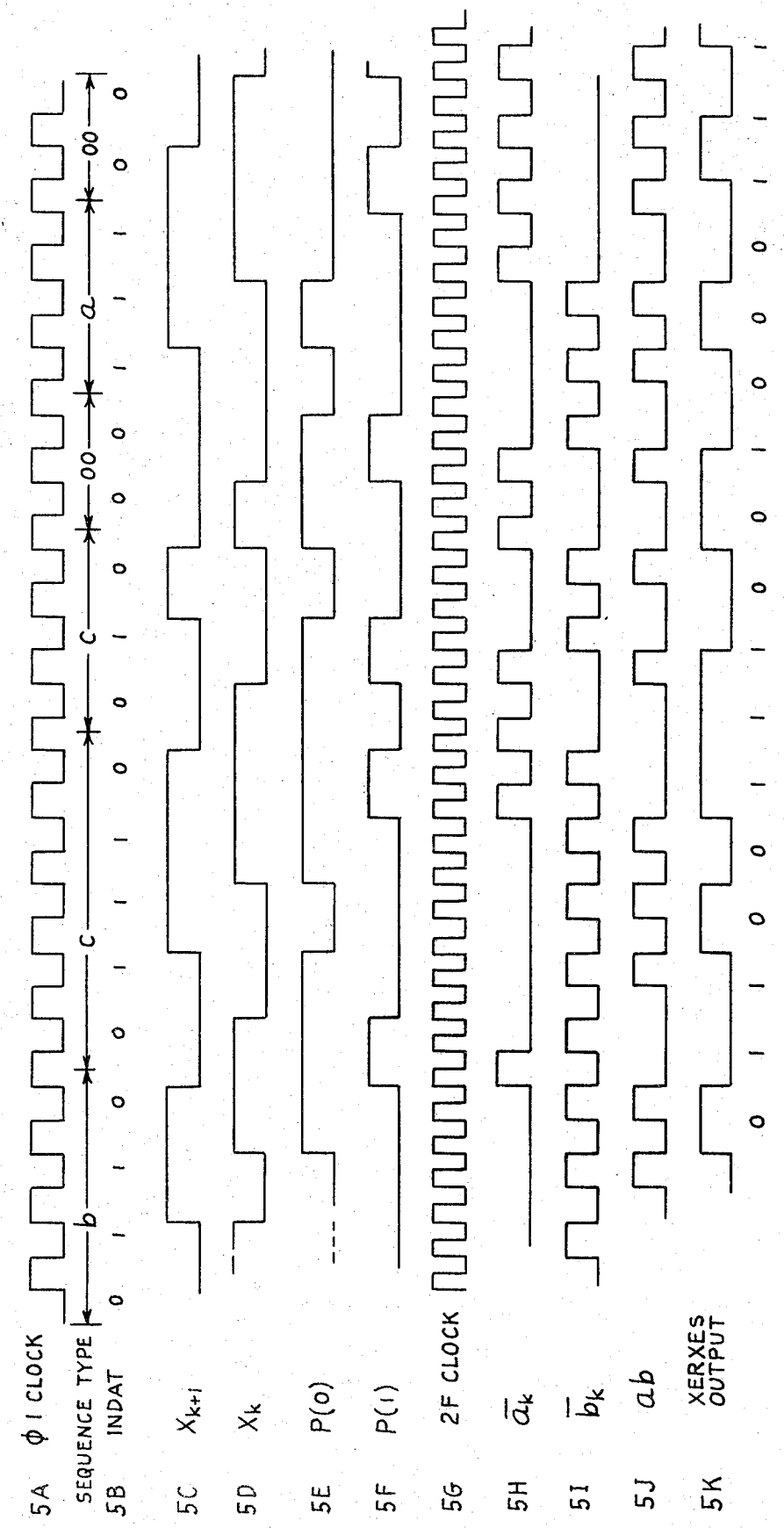
FIG. 5 is a timing diagram illustrating the operation of the encoder of FIG. 4.

While a number of other circuits could be used, a preferred encoder 22 is illustrated in FIG. 4, with a timing diagram for that circuit being shown in FIG. 5. (The points in the circuit of FIG. 4 where the respective waveforms shown in FIG. 5 appear are identified by corresponding circled letters on FIG. 4.) The inputs to the encoder 22 are the phase 1 ($\phi$1) and phase 2 ($\phi$2) clock pulses applied from the clock 16 over paths 24 and 20, respectively, the double clock pulses applied from the 2F clock 18 over the path 25, and the data input INDAT applied over path 12. There is also a reset pulse $\bar{I}$ applied over a path 52 from an initialization pulse source 54. An input terminal 56 is coupled to the emitter terminal of a bipolar transistor Q10, with the base terminal thereof coupled to ground potential. The collector terminal of the transistor Q10 is coupled to input terminals of an AND gate 55 at a circuit junction point 57. The AND gate 55 functions to translate the voltage levels at the input terminals thereof to transistor-transistor logic levels at the output thereof. The cathode terminal of a clamping diode D10 is coupled to the point 57 and the anode terminal of this diode is coupled to ground potential. A resistor R10 is coupled between the junction point 57 and a source of positive voltage to form in combination with the diode D10 a bias voltage circuit between the transistor Q10 and the AND gate 55. The initialization pulse source 54 produces a reset pulse $\bar{I}$ upon application of an initialization signal INIT to the input terminal 56 thereof. The reset pulse $\bar{I}$ is applied to the encoder 22 to reset the various components thereof to a starting condition.

As illustrated by FIG. 5A, the $\phi$1 clock pulses are uniform pulses occurring periodically with a period equal to one bit cell length and having fast rise and fall times and having a pulse length of one-half bit cell. The $\phi$2 clock pulses are identical to the $\phi$1 clock pulses except delayed one-half bit cell. Thus, the $\phi$1 clock pulses rise at the beginning of each bit cell, and the $\phi$2 clock pulses rise at the midpoint of each bit cell. The $\phi$1 and $\phi$2 clock pulses may be produced by the clock circuit 16 illustrated in which double pulses from 2F clock 18 (as shown in FIG. 5G) are applied over the path 17 to the CLK terminal of a JK flip-flop 58. $\phi$1 clock pulses thereupon appear at frequency 1F at the Q terminal of the flip-flop, and $\phi$2 clock pulses appear at the $\bar{Q}$ terminal. In one embodiment of the invention, the 2F clock is equal to two (2) Megahertz and the 1F clock is equal to one (1) Megahertz. Thus, the data bit rate is equal to one (1) Megabit per second.

The input data INDAT (FIG. 5B) are applied in the form NRZ-L to the D input terminal of a D flip-flop 60. The $\phi$1 clock pulses are applied to the clock terminal of the D flip-flop 60, whereby each positive-going transition of the $\phi$1 clock pulses (as shown in FIG. 5A) causes the signal on the D input terminal to be transferred to the Q output terminal. The signal appearing at terminal Q of the D flip-flop 60 is shown in FIG. 5C as $x_{k+1}$. This is the signal for the bit next to be encoded after the bit (k) being currently encoded. At the same time, the inverted signal $\bar{x}_{k+1}$ appears at the $\bar{Q}$ output terminal of the D flip-flop 60. The signal $x_{k+1}$ is applied to input terminal D of a D flip-flop 62 which transfers the signal to output terminal Q of the D flip-flop 62 upon the occurrence of the next $\phi$1 pulse applied to its clock terminal. The signal at terminal Q of the D flip-flop 62, shown in FIG. 5D, is thus $x_k$, the signal for the bit being encoded, its inverse $\bar{x}_k$ appearing at output terminal $\bar{Q}$. It is from these signals $x_{k+1}$, $\bar{x}_{k+1}$, $x_k$ and $\bar{x}_k$ that the transitions for the encoded signals are fashioned.

Zero (0) parity is determined by a $\overline{JK}$ flip-flop 64. To this end, the $x_k$ signal is applied to the $\bar{J}$ and $\bar{K}$ input terminals. When clocked by the $\phi$1 clock pulses, the Q output terminal provides a count modulo-2 of the number of zero (0) bits from start (reset) up to the bit being encoded, that is, the count of 0 bits that have been encoded. Thus, when $x_k$ is 0, the $\overline{JK}$ flip-flop changes state when clocked by the next $\phi$1 clock pulse to count a zero (0) bit. When $x_k$ is 1, the $\overline{JK}$ flip-flop remains in its same state. The output signal P(0) on the terminal Q, shown in FIG. 5E, is thus a parity count, being 1 when there has been an odd number of 0 bits and 0 when there has been an even number of 0 bits. The inverse $\overline{P(0)}$ appears on the output terminal $\bar{Q}$.

One (1) parity is determined by a $\overline{JK}$ flip-flop 66. To this end, the $\bar{x}_k$ signal is applied to the $\bar{J}$ input terminal, and no signal is applied to the $\bar{K}$ terminal. When a low logic level or 0 is applied to the $\bar{J}$ terminal, which occurs when the D flip-flop 62 has 1's signal bits at its output terminal Q, the $\overline{JK}$ flip-flop 66 acts like the $\overline{JK}$ flip-flop 64 and counts 1's modulo-2 when clocked by the $\phi 1$ clock pulses. When a high logic level or 1 is applied to the $\overline{J}$ terminal, which occurs when the D flip-flop 62 has 0's signal bits at its output terminal Q, the count is reset to 0. Hence, the output signal P(1) on the output terminal Q, shown in FIG. 5F, is a parity count, being 1 when there has been an odd number of 1's since the last previous 0 bit and 0 when there has been an even number of 1's. The inverse $\overline{P(1)}$ appears at the $\overline{Q}$ output.

Encoding of the input data INDAT is effected by variously applying the signals developed by the D flip-flops 60 and 62 and by the $\overline{JK}$ flip-flops 64 and 66 to NOR gates 72, 74, 76 and 78 which are enabled by $\phi 1$ and $\phi 2$ clock pulses. The understanding of the operation of these gates will be facilitated by determining when an output transition pulse is not to be created and considering that a transition pulse is produced for other conditions. It will also be helpful to consider the transition pulses as occurring in one of two parts of the bit cell, a relatively early or edge-cell transition being considered an a transition and a relatively late or mid-cell transition being considered a b transition.

Considering first the a transition, the primary signal is developed by the NOR gate 72, to which there are three inputs. One input is $\overline{x}_k$ from the $\overline{Q}$ terminal of the D flip-flop 62. Another input is the $\phi 2$ clock signal. When the third input is 0, the output of the NOR gate is 1 when $\overline{x}_k$ is 0 and the $\phi 2$ clock signal is 0. The $\phi 2$ clock pulse, the inverse of the $\phi 1$ clock signal shown in FIG. 5A, is 0 during the first or a half of each bit period or bit cell. Hence, a signal $\overline{a}$, the inverse of a, the signal for the first half, will be 1 whenever $\overline{x}_k$ is 0, hence when $x_k$, the signal being encoded, is 1. This means that an edge-cell a transition would appear otherwise, that is, when $x_k$ is 0, the normal encoding of a 0 bit.

For the normal Miller format, it is necessary to suppress transitions (X in FIG. 1G) that occur less than a bit cell after a previous transition, that is, for 0 bits following a 1 bit in the normal Miller code. That is achieved by a D flip-flop 80, which has its $\overline{Q}$ output terminal connected to its D input terminal and is clocked by the 2F clock pulses (FIG. 5G). The output of the NOR gate 72 is also connected to the D input terminal to form a so-called wired OR gate at a circuit junction point 81. The gates 72, 74, 76 and 78 and the flip-flop 80 are preferably of the emitter coupled logic family type. However, other logic family types may be employed when an OR gate is substituted for the so-called wired OR gate at the junction 81.

As the D flip-flop 80 is clocked at the double frequency 2F, it is clocked in synchronism with each half of the $\phi 1$ and $\phi 2$ clock pulses. The signal fed back from the $\overline{Q}$ output is thus the inverse of the signal previously clocked through in the next preceding half bit. As will be explained further below, when the NOR gate 72 is enabled by the $\phi 2$ clock pulse, the $\overline{Q}$ output of the D flip-flop 80 is the signal encoded in the last half of the previous bit $b_{k-1}$, that is, a 1 is fed back when there was a mid-cell transition in the previous bit cell. When added to the output of the NOR gate 72, this signal makes $\overline{a}_k$ 1 when there was a mid-cell transition in the previous bit cell, hence making $a_k$ 0 and suppressing an edge-cell transition when there was a mid-cell transition in the next preceding bit cell. This is in accordance with the standard Miller format. This also provides for reinsertion of a transition (R in FIGS. 1I and 2E) whenever the mid-cell transition of the prior 1 bit has been suppressed in accordance with the Xerxes format.

In accordance with the Xerxes format, it is also necessary to insert an edge-cell transition (A in FIGS. 1I and 2E) for the odd 1 of two 1's of sequences of types (b) or (c). This is effected by the NOR gate 74. One input is $\overline{x}_{k+1}$ from the $\overline{Q}$ output of the D flip-flop 60. The signal $\overline{x}_{k+1}$ is 0 when its inverse $x_{k+1}$ is 1, indicating that the bit after that being encoded is 1. A second input is $\overline{P(0)}$ from the $\overline{Q}$ output of the $\overline{JK}$ flip-flop 64. The signal $\overline{P(0)}$ is 0 when its inverse P(0) is 1, signifying an odd number of 0's since the start and hence indicating a sequence of type (b) or (c). A third input is P(1) from the Q output of the $\overline{JK}$ flip-flop 66. The signal P(1) is 0 when the bit being encoded is not an even number of 1's since the last 0. The consequence of this is that the output of the NOR gate 74 is 1 only when encoding an odd 1 of a pair of 1's in a sequence of type (b) or (c). This output is applied to the third input of the NOR gate 72 to introduce the extra transition at the output of the NOR gate 72 under such conditions.

The signal $\overline{a}_k$ (FIG. 5H) applied to the D input to the D flip-flop 80 during the first half of a bit cell is therefore $$\overline{a}_k = b_{k-1} + x_k (x_{k+1} P(0) \overline{P(1)}). \quad (1)$$

The term $b_{k-1}$ is the $\overline{Q}$ output of the flip-flop 80, which $\overline{Q}$ output provides both $a_{k-1}$ and $b_{k-1}$ in successive double frequency time slots. However, only $b_{k-1}$ is provided for the above equation, and $a_{k-1}$ is not used in the encoding operation.

As to the b transition, the primary signal is developed by the NOR gate 76. One input is $x_k$ from the Q output of the D flip-flop 62. The other input is the $\phi 1$ clock signal. When $x_k$, the signal being encoded, is 0, the $\phi 1$ clock pulse enables the NOR gate 76 during the second or b half of each bit cell. Hence, absent any other input, a signal $\overline{b}$, the inverse of b, will be 1 whenever $x_k$ is 0. This means that a mid-cell b transition would appear otherwise, that is, when xhd k is 1, the normal encoding of a 1 bit.

In accordance with the Xerxes format, it is necessary to suppress the transition (X in FIGS. 1I and 2E) that would otherwise normally be produced in encoding the second (or even parity) 1 of a pair of 1's in a sequence of type (b) or (c). This suppression is effected by the NOR gate 78. One input is $\overline{P(0)}$ from the $\overline{Q}$ output of the $\overline{JK}$ flip-flop 64. The signal $\overline{P(0)}$ is 0 when its inverse P(0) is 1, signifying an odd number of 0's since the start and hence indicating a sequence of type (b) or (c). A second input is $\overline{P(1)}$ from the $\overline{Q}$ output of the $\overline{JK}$ flip-flop 66. The signal $\overline{P(1)}$ is 0 when its inverse P(1) is 1, signifying that the previous bit encoded was a 1. The third input is the $\phi 1$ clock signal which enables the NOR gate 78 during the b half of the bit cell. Thus, $\overline{b}$ is 1 and b 0 when an even parity 1 is encoded for sequences of types (b) and (c).

Also in accordance with the Xerxes format, it is necessary to advance the transition from mid-cell to edge-cell (A in FIGS. 1I and 2E) under certain conditions. The advanced transition is effected by the NOR gate 74, as described above. To complete the advance, it is necessary to suppress the mid-cell transition that would otherwise occur in the normal encoding of a 1. This is effected by the D flip-flop 80. In this case, it is the $a_k$ signal that is fed back to the D input during the period that the NOR gates 76 and 78 are enabled. This makes $\bar{b}_k$ 1 whenever $a_k$ is 1; hence it makes $b_k$ 0 whenever $a_k$ is 1, suppressing a mid-cell transition in the same bit cell.

The signal $\bar{b}$ (FIG. 5I) applied to the D input of the D flip-flop 80 during the second half of a bit cell is therefore:

$$\bar{b}_k = a_k + \bar{x}_k + P(0)P(1) \qquad (2)$$

The signals $\bar{b}_k$ and $\bar{a}_k$ are mutually exclusive in time as the former is 0 during the first half of a bit cell and the latter is 0 during the last half of a bit cell. This is because the respective enabling $\phi 2$ and $\phi 1$ pulses are mutually exclusive. Thus, signals $\bar{a}_k$ and $\bar{b}_k$ are applied without interference to the D input of the D flip-flop 80 where they are clocked successively to the Q output by the 2F clock pulses from the 2F clock 18, the inverse signals $a_k$ and $b_k$ being produced at the $\bar{Q}$ output. The combined signal ab at the $\bar{Q}$ output terminal as shown in FIG. 5J, hence, one-half bit delayed from the inputs at terminal D. The delayed signal is fed back to the D input terminal as described above.

The inverted signal $\overline{a_{k-1}, b_{k-1}}$ at the Q output of the D flip-flop 80 is in NRZ-L form. It is applied to the $\bar{J}$ and $\bar{K}$ terminals of a $\overline{JK}$ flip-flop 82 which is clocked by the 2F clock pulses (FIG. 5G) from the 2F clock 18. It is the function of the flip-flop 82 to provide transitions in response to the levels of the NRZ-L form of the data at the Q output of the flip-flop 80. The clock pulses cause a change of state at the Q output of the flip-flop 82 whenever the input level is 1 and leave the state the same whenever the input level is 0. This causes a change of state, that is, a transition, whenever $\overline{a_{k-1}, b_{k-1}}$ is 1 at a 2F clock pulse. This results in an output signal at the Q output in accordance with the Xerxes format, as shown in FIG. 5K.

The special tasks of the encoder shown in FIG. 4 may be summarized as follows. It recognizes the beginning of each sequence of 1's which may be of type (b). This is done in the encoder of FIG. 4 by means of the D flip-flop 64 which toggles each time a 0 is encoded. Its Q output P(0) provides a parity count of whether 0's, are odd or even at the beginning of a sequence of 1's. An odd count indicates a sequence of type (b) or type (c). The encoder recognizes at the end of such sequence whether it is of type (b) or of type (c). This is done in the encoder of FIG. 4 by means of the flip-flop 66 which toggles each time a 1 is encoded and which is cleared each time a 0 is encoded. Its Q output P(1) provides a count of whether 1's are odd or even. If odd when a 0 is reached, the sequence is of type (c); if even of type (b). Sequences of 1's of type (b) or (c) are encoded by a transition at the edge of the first (odd parity) 1 of a pair of 1's, with the last 1 of an odd sequence of 1's of type (c) encoded in the standard Miller code of U.S. Pat. No. 3,108,261. All other encoding follows the prescriptions of Miller U.S. Pat. No. 3,108,261, keeping in mind that the standard Miller code would encode the 0 at the end of a sequence of type (b) with an edge-cell transition because there is no mid-cell transition for the preceding 1 in Xerxes.

As indicated in FIG. 3, the encoded information on the path 26 passes through the information channel 28 and then over the path 30 to the transition detector 32. The output of the transition detector is applied over the path 46 to the 2F clock 42 and over the path 34 to the decoder 36. The output of the 2F clock 42 is applied to the decoder 36 over the path 48. Exemplary forms of the 2F clock 42, the decoder 36 and the transition detector 32 are shown in FIG. 6. Timing diagrams for the circuit of FIG. 6 are shown by the waveforms of FIG. 7, with points in the circuit of FIG. 6 where respective waveforms shown in FIG. 7 appear being identified by respective circled letters.

Referring to FIG. 6, a received signal of the form illustrated by the waveform shown in FIG. 7A is applied on path 30 to the transition detector 32. The transition detector 32 comprises a limiter circuit 132 and a differentiating circuit 134. The limiter circuit 132 greatly amplifies the input signal and cuts the peaks off to produce a corresponding limiter output signal on the path 34 having sharp transitions at the zero crossings of the input signal, as shown by the waveform of FIG. 7B. The inverted output signal from the limiter 132 is applied to the differentiating circuit 134, which develops signals of opposite phase in an amplifier 136. The two outputs of the amplifier 136 are applied to both of NOR gates 138 and 140 with the inverted signal being delayed slightly by a delay line 142 in its application to the NOR gate 138 and the non-inverted signal being delayed slightly by a delay line 144 in its application to the NOR gate 140. The differentiating circuit 134 thus provides on the path 46 a transition signal of the waveform shown in FIG. 7C, with a pulse for each transition in the input signal of FIG. 7A.

The 2F clock 42 in this embodiment comprises a ringing oscillator producing a signal in the form shown in FIG. 7D, which, after amplifying and limiting, becomes a square wave on the path 48 as shown in FIG. 7E. The integrated circuit A3 forming the clock 42 in the embodiment illustrated comprises a Motorola Triple Line Receiver MC10216 connected as indicated, with pins 1 and 16 grounded and pin 8 at −5.2 v. The phase of the pulses on the path 46, relative to the oscillations in the tank circuit of the oscillator, advances or retards the oscillations to synchronize the clock output on the path 48 with the transitions in the input information on the path 30. The phase of the clock output may be adjusted by a variable inductor 146 to place the clock pulses as shown in FIG. 7E in appropriate relationship to the transitions in the limiter output signals as shown in FIG. 7B.

The second output of the limiter 132 is coupled to the decoder 36 over the path 34 to the D input of a D flip-flop 148, which output signal is illustrated by FIG. 7B. The 2F clock pulses (FIG. 7E) are applied over the path 48 from the clock circuit 42 to the clock input terminal of the D flip-flop 148. This clocks the data from the D input terminal to the Q output terminal of the D flip-flop 148, producing a signal as shown in FIG. 7F, which corresponds to the input data of FIG. 7A delayed by one-half cycle of the 2F clock pulses. The signal on the Q output terminal of the D flip-flop 148 is applied to the D input terminal of a D flip-flop 154. The 2F clock pulses are applied to the clock terminal of the D flip-flop 154. The D flip-flop 154 thus clocks the Q output of the D flip-flop 148 and reproduces that output at the Q output terminal of the D flip-flop 154 (FIG. 7G) with a delay of one 2F clock pulse, that is, with one-half bit cell displacement. The 2F clock pulses are also applied to the clock terminal of a $J\bar{K}$ flip-flop 160, the J terminal being held positive and the $\bar{K}$ terminal being held at ground. This toggles the $J\bar{K}$ flip-flop 160 to produce an output signal on its Q terminal as shown in FIG. 7H. These are clock pulses of frequency 1F, which comprises the bit cell rate of the data. These clock pulses are applied to the path 51 as the output clock pulses to the data utilization circuit 40.

The D input and Q output terminals of the D flip-flop 154 are connected to an exclusive OR gate 172 which detects a difference between the clocked data signal (FIG. 7F) and the clocked data signal delayed (FIG. 7G). The output of the exclusive OR gate 172 thus indicates any transition in the input data occurring since a previous 2F clock pulse on the clock terminal of the D flip-flop 154. A 1 output of the exclusive OR gate 172 thus indicates a data transition, as shown in FIG. 7I.

The data transition signals of FIG. 7I are applied to the S input terminal of a 5-bit shift register 174. In the embodiment illustrated, the 5-bit shift register 174 comprises a Texas Instruments type 7496 5-Bit Shift Register connected as shown in FIG. 6 with the manufacturer's connecting pin numbers identified therewith. The shift register 174 is clocked by the 2F clock pulses (FIG. 7E). The shift register serially clocks in the transition data from the gate 172 with each clock pulse and advances the data along the five output terminals one after the other. As the shift register is clocked by 2F clock pulses, the shift register advances each half bit cell. The bit cells follow successively at frequency 1F, each bit cell having two halves, a and b, successively. The halves therefore occur at double frequency 2F, the clocking rate for the 5-bit shift register. The data are clocked out of the decoder 36 to the path 38 at the bit rate 1F, as will be explained further below. At the time of such clocking out of the decoded bit, the outputs $Q_A$, $Q_B$, $Q_C$, $Q_D$ and $Q_E$ of the 5-bit shift register 174 contain the transition data in respect to the half bit cells $b_{k+1}$, $a_{k+1}$, $b_k$, $a_k$ and $b_{k-1}$, respectively. What the outputs contain at the succeeding 2F clocking is immaterial, as the output is clocked out of the decoder only once per bit cell. Thus, the outputs have been labeled in FIG. 6 to indicate the condition at the time of clocking out the decoded bit signal to the output path 38.

The five outputs of the 5-bit shift register 174 are combined to develop the decoded signal. The signals are combined to identify 1's, with each bit not a 1 being decoded as 0. From the Xerxes encoding format explained above, there are three ways in which a 1 is encoded. Normally, 1's are encoded by a mid-cell transition, i.e., $a_k$ is 0, $b_k$ is 1. Where 1's occur in a sequence of type (b) or (c), pairs of 1's are encoded by an edge-cell transition for the first (odd parity) 1 of the two 1's; thus, for the first (odd parity) 1 of these two 1's $a_k$ is 1 and $b_k$ is 0, and $a_{k+1}$ is 0 and $b_{k+1}$ is 0, and for the second or even parity 1 of these two 1's $a_k$ is 0 and $b_k$ is 0, and $b_{k-1}$ is 0.

The normal condition (i.e., 1's encoded as midcell transitions) is sensed by an AND gate 176 to which are applied the inversion of the $Q_B$ output $a_k$ (as inverted by an inverter 178 to $\bar{a}_k$) and the $Q_C$ output $b_k$, as shown in FIG. 7J. The AND gate 176 thus provides a 1 output when $a_k$ is 0 (that is, $\bar{a}_k$ is 1) and $b_k$ is 1. This signal is applied to a NOR gate 180 which produces a 0 output under these conditions.

A 1 that is the odd 1 of a pair of 1's encoded according to the special Xerxes rules is sensed by an OR gate 182 and a NOR gate 184. The $Q_A$ output $b_{k+1}$ and the $Q_B$ output $a_{k+1}$ are applied to the OR gate 182. The OR gate 182 produces a 0 output only when both $b_{k+1}$ and $a_{k+1}$ are 0. This signal is applied to the NOR gate 184 together with the $Q_C$ output $b_k$ and the inverted $Q_D$ output $\bar{a}_k$. Thus, the NOR gate 184 produces a 1 output only when $b_{k+1}$ and $a_{k+1}$ are 0, $b_k$ is 0 and $\bar{a}_k$ is 0 (that is, $a_k$ is 1). This corresponds to an edgecell transition in a bit cell followed by a bit cell with no transition. This signal is also applied to the NOR gate 180 which produces a 0 output under these conditions.

A 1 that is the second of a pair of ones encoded according to the special Xerxes rules is sensed by a NOR gate 186 to which are applied the $Q_C$ output $b_k$, the $Q_D$ output $a_k$ and the $Q_E$ output $b_{k-1}$. The output of the NOR gate 186 is 1 only when $a_k$, $b_k$ and $b_{k-1}$ are all 0 as occurs only for the even 1 of a pair of 1's encoded according to Xerxes. The output of the NOR gate 186 is also applied to the NOR gate 180 which produces a 0 under these conditions.

The NOR gate 180 thus produces a 0 output whenever any one of three conditions indicating a 1 exists. Otherwise, its output is 1. The output of the NOR gate 180 is applied to the D input of a D flip-flop 188, which is clocked by the 1F clock pulse (FIG. 7H). Each clock pulse transfers the output of the NOR gate 180 to the Q output terminal of the D flip-flop 188, the inverse appearing at the $\bar{Q}$ output terminal. The $\bar{Q}$ output is thus 1 under the conditions where the 0 output of the NOR gate 180 indicates that a 1 has been decoded, and the $\bar{Q}$ output is otherwise 0. The $\bar{Q}$ output is applied to the path 38 in the form NRZ-L as indicated in FIG. 7K.

As a brief summary, reference is made to TABLE I below wherein X represents either a one or a zero.

TABLE I

| $b_{k-1}$ | $a_k$ | $b_k$ | $a_{k+1}$ | $b_{k+1}$ | $X_k$ | |
|---|---|---|---|---|---|---|
| X | 0 | 1 | X | X | 1 | by AND gate 176 |
| X | 1 | 0 | 0 | 0 | 1 | by gates 182 and 184 |
| 0 | 1 | 0 | 1 | 0 | 0 | |
| 0 | 1 | 0 | 0 | 1 | 0 | |
| 0 | 0 | 0 | X | X | 1 | by NOR gate 186 |
| 1 | 0 | 0 | X | X | 0 | |
| X | 1 | 1 | X | X | | Transmission Error |
| 1 | 1 | X | X | X | | Transmission Error |
| 0 | 0 | 0 | 0 | 0 | | Transmission Error |
| 1 | 0 | 0 | 0 | 0 | | Synchronization Error |

The above description of the circuit of FIG. 6 has assumed the clock 42 to be in proper synchronism with the edge-cell transitions. However, because the clock 42 has a basic frequency twice the bit cell frequency, it is possible for the clock to be in phase with the mid-cell transitions rather than with edge-cell transitions. In that case, the data out at the output terminal $\bar{Q}$ of the D flip-flop 188 would appear as shown in FIG. 7L. The lack of synchronization may be detected by a synchronization detector 190 which recognizes certain impermissible output conditions. In the Xerxes format the longest permissible interval between transitions occurs at the end of sequence of type (c) where the final three 1's are encoded by an edge-cell transition for the first of the three 1's, no transitions for the second of the three 1's, and a mid-cell transition for the last of the three 1's. Using the designations of FIG. 6, this condition occurs when $a_{k-1}$ and $b_{k+1}$ are both 1 and $b_{k-1}$, $a_k$, $b_k$ and $a_{k+1}$ are all 0. The condition is decoded by the NOR gate 186 when clocked out of the D flip-flop 188 by the 1F clock pulse during an interval while the $b_{k-1}$ signal appears at the $Q_E$ output terminal of the 5-bit shift register 174. Should the 1F clock pulse be out of proper phase in relation to the 2F clock pulse, the D flip-flop 188 would be clocked out a half cycle prematurely. With the above transitions the outputs $Q_A$, $Q_B$, $Q_C$ and $Q_D$ were all 0 a half cycle earlier. To the decoder this would look like two successive bit cells without a transition in either half. However, this is not a possible condition under the Xerxes format. The only condition producing 2.5 T between transitions, that is, with four half-cells in a row without transition, is at the termination of a sequence of type (c). In that case only the middle 1 of the last three 1's is encoded without a transition in either half. Thus, a condition where terminals $Q_A$, $Q_B$, $Q_C$ and $Q_D$ are all 0 at the time of clocking is an indication that the decoder is out of synchronization.

The synchronization detector 190 detects a lack of synchronization by noting the occurrence of the condition where the terminals $Q_A$, $Q_B$, $Q_C$ and $Q_D$ are all 0 at the time of clocking. To this end these terminals are connected to a NOR gate 192 which produces a 1 output only when all inputs are 0. The output of the NOR gate 192 is applied to the D input terminal of a D flip-flop 194 clocked by the 1F clock pulses (FIG. 7H). This produces a 1 output on the Q output terminal of the D flip-flop 194 at the next clock pulse when all of the terminals $Q_A$, $Q_B$, $Q_C$ and $Q_D$ are 0 simultaneously. The output signal may be used in a number of ways, as to operate an indicator or means for placing the decoder in synchronism. The 1F clock may be returned to synchronism in a number of ways, as by suppressing a 2F pulse to the $J\overline{K}$ flip-flop 160, in a manner similar to the synchronizing circuit described in Miller U.S. Pat. No. 4,027,335. To assure synchronization, a special lead-in signal may be transmitted that includes at least one sequence of type (c), permitting the synchronization detector 190 to identify lack of synchronization and permit remedial action at the outset. This avoids losing data before the data bits themselves provide transitions revealing the error in synchronization.

It may be noted that a signal indicating lack of synchronization will also occur at the output of the synchronization detector 190 when there is a loss of signal on the path 30. This condition can be distinguished from the condition of lack of synchronization by noting the output signals from the 5-bit shift register 174. With loss of signal, all outputs will go to 0 simultaneously; whereas, in normal Xerxes encoding there can never be more than four half-cells in a row without a transition, and hence one of the outputs must be 1 whether the decoder is in or out of synchronization, so long as a signal is being received in the Xerxes format.

At the start of decoding the various components of the decoder may be reset by a reset pulse $\overline{I}$ from an initialization pulse source 196 operating like the similar circuit 54 of the encoder.

As mentioned above, the longest interval between transitions under the Xerxes format is at the termination of a sequence of type (c); yet this is a sequence that could have been encoder under the standard Miller format without introducing a DC component. As the long intervals without transitions require a greater bandwidth, the bandwidth requirements are lessened by using the standard Miller format to encode sequence of type (c). The difficulty with this is that sequences of types (b) and (c) cannot be distinguished at their onset. It is only upon termination of the sequence that the number of 1's can be determined as odd or even. Thus, to encode sequences of type (c) in the standard Miller format, one must look ahead to the end of the sequence. As a sequence may be very long, this is impractical, as it requires almost infinite look-ahead capability. Therefore, in one embodiment of this invention a limited look-ahead capability is provided for looking ahead some reasonable number of bits and encoding sequences that can thereby be identified as type (c) in the standard Miller format. Where the end of the sequence cannot be seen, the sequence is encoded under the Xerxes rules as set out above. An encoder with 5-bit look-ahead capability is shown in FIGS. 8 and 9. The look-ahead circuitry and parity counters are shown in FIG. 8. The encoding circuitry is shown in FIG. 9. Corresponding waveforms are illustrated in FIG. 10. Points in the circuits of FIGS. 8 and 9 where respective waveforms shown in FIG. 10 appear are identified by respective circled letters.

The look-ahead circuitry of FIG. 8 receives the same input signals as the encoder 22 shown in FIG. 4, namely, $\phi 1$ clock pulses on the path 24 (FIG. 10A), the data input INDAT in form NRZ-L on the path 12 (FIG. 10C), and reset pulses $\overline{I}$ on the path 52. The other input signals to the encoder 22 are applied to the circuit of FIG. 9, namely $\phi 2$ clock pulses on the path 20 and 2F clock pulses (FIG. 10B) on the path 25. The $\phi 1$ clock pulses and the reset pulses $\overline{I}$ are also applied to the circuit of FIG. 9.

In the circuit of FIG. 8, the input data signals INDAT (FIG. 10C) are applied serially to the A and B input terminals of an 8-bit shift register 196 (serial in/parallel out), preferably Texas Instruments type 74164 connected as shown. The 8-bit shift register 196 provides a 7-bit delay to permit a look-ahead with respect to the data output from the shift register. That is, if the data output at the $Q_H$ output terminal (FIG. 10E) is the signal $x_k$ to be currently encoded, the signal on the $Q_G$ output terminal is $x_{k+1}$ and so on to the $Q_A$ output terminal which provides the signal seven bits after $x_k$, namely $x_{k+7}$. Should a sequence occur which can be determined to be of type (c) by the time the first 1 of the sequence reaches the $Q_H$ output, the entire sequence is encoded according to the standard Miller code. The circuit shown in FIG. 8 makes this determination and sets a flag G to modify the Xerxes encoding (FIG. 9) for a recognized sequence of type (c).

The creation of the flag G begins with the signal $x_{k+7}$ (FIG. 10D). The signal $x_{k+7}$ is applied to the $\overline{K}$ input terminal of a $J\overline{K}$ flip-flop 198 with the signal $\bar{x}_{k+7}$ as inverted by an inverter 200 applied to the J input terminal. The $J\overline{K}$ flip-flop thus counts 0's from the beginning of encoding at a time 7 bits before the signal $x_k$ is available at the terminal $Q_H$ for encoding. The $J\overline{K}$ flip-flop 198 is clocked by the $\phi 1$ clock pulses to produce a 0 parity count at the Q output terminal (FIG. 10F). The $\overline{Q}$ output of the $J\overline{K}$ flip-flop 198 is applied to the D terminal of a D flip-flop 202 clocked by the $\phi 1$ clock pulses. The $\overline{Q}$ outputs of the $J\overline{K}$ flip-flop 198 and the D flip-flop 202 are applied to a NAND gate 204 which thus provides a 1 output (FIG. 10H) whenever the parity of 0's at the terminal $Q_A$ is 0, that is, when there has been an even number of 0's since the beginning.

Such 1 output is applied to the $\overline{CLR}$ terminal of a counter 206 which may be a counter of Texas Instruments type 74161 connected as shown having a 1's output count at terminal $Q_A$ (FIG. 10I), a 2's output count at output terminal $Q_B$ (FIG. 10J), and a 4's output count at output terminal $Q_C$ (FIG. 10K). When enabled by a 1 applied to its enabling terminal EN (FIG. 10G) the counter 206 counts $\phi 1$ clock pulses applied to its CLK terminal. The enabling signal is produced by an AND gate 208 when its three input signals are all 1, that is, when (1) $x_{k+7}$ (FIG. 10D) at the output terminal $Q_A$ of the shift register 196 is 1, indicating a 1 in a series of 1's, (2) the 0 parity count (FIG. 10F) at the output terminal Q of the $J\overline{K}$ flip-flop 198 is 1, indicating that the sequence of 1's began with a 0 and is thus of type (b) or type (c), and (3) the output of a NAND gate 210 is 1, indicating that the counter 206 has not reached a count of 6. A count of 6 would make the $Q_B$ and $Q_C$ outputs of the counter 206 both 1, and hence both inputs to the NAND gate 210 would be 1. The consequence of this is that the counter 206 counts (up to a maximum of 6), the $\phi 1$ clock pulses occurring whenever a sequence of 1's occurs wih 0 at odd parity, that is, whenever the 1's are a part of a sequence of type (b) or type (c). If the counter 206 does not reach a count of 6 before a 0 is reached in the data stream, the counter will stop counting upon the occurrence of the first 0 at the output terminal $Q_A$ of the shift register 196 (FIG. 10D), for that applies a 0 to the input of the enabling AND gate 208, making its output 0 (FIG. 10G) and disabling the counter 206. The parity counter $J\overline{K}$ flip-flop 198 also produces a 0 at its Q output terminal (FIG. 10F) indicating an even number of 0's and applies a 0 to the AND gate 208 so that the counter remains disabled with subsequent 1's in the data input. The even parity also resets the counter by way of the D flip-flop 202 and the NAND gate 204 (FIG. 10H) as described above. A count of 6 in the counter 206 also disables the counting by producing a 0 output from the NAND gate 210, which is applied to the enabling AND gate 208.

The determination of whether or not to create a flag G is made by an AND gate 211. The signal from the 1's output terminal $Q_A$ (FIG. 10I) of the counter 206 and the inverted signal $\bar{x}_{k+7}$ from the inverter 200 (FIG. 10D inverted) are applied to the AND gate 212. The 1's output is 1 at the end of a sequence of 1's only if the number of 1's in the sequence is odd and less than 6. If the count is even and less than 6, the 1's output is 0. If the number of 1's in the sequence is 6 or more, the counter stops at 6, leaving the 1's output at 0. Hence, it is only when the 1's count by the counter 206 is 1, 3 or 5 at the time of the next 0 at the terminal $Q_A$ (FIG. 10D) of the shift register 196 that the AND gate 212 produces a 1. This output (FIG. 10L) is 1 whenever a flag G is to be created.

The output of the AND gate 212 is applied to the enabling terminal EN of a demultiplexer 214, which may be of Texas Instruments type 74S138 connected as shown. When enabled by a 1 from the AND gate 212, the demultiplexer 214 transfers the input count applied from the counter 206 to a 6-line output, producing a 0 on the line corresponding to the final count. The rest of the output lines are at 1. For a count of 1, the 0 appears on output b; for a count of 3 on output d (FIG. 10M); and for a count of 5 on output f (FIG. 10N). There can be no even counts since the AND gate 212 enables the demultiplexer only for a 1, 3 or 5 count as stated above.

The outputs of the demultiplexer 214 are applied to respective AND gates 216, 218, 220, 222, 224 and 226. The outputs of these AND gates are applied to the input terminals of parallel access shift registers 228 and 230, which may be of Texas Instruments type 74195 connected as shown. As so connected, upon application of each $\phi 1$ clock pulse (FIG. 10A), the 0 applied from the demultiplexer shifts through the shift register until it is provided as an output at terminal $Q_C$ of the register 230. This 0 output is coupled to the input of a latch 232, which may comprise a Texas Instruments flip-flop 7476 connected as shown.

The application of 0 to the input terminal of the latch 232 produces the flag G (FIG. 10Q) at the Q output terminal thereof at the time the first 1 of the series reaches output terminal $Q_H$ of the shift register 196. Its inverse $\overline{G}$ is produced at the $\overline{Q}$ output terminal of the latch 232. The flag G then remains set until the end of the sequence, when it is reset by the Q output P(0) (FIG. 10P) of a 0 parity detector 234, which may be a Texas Instruments $J\overline{K}$ flip-flop of type 74109 connected as shown. The 0 parity detector 234 functions like the parity detector of the $J\overline{K}$ flip-flop 198 to determine whether a number of 0's from the beginning of encoding is even or odd, that is, whether or not a sequence of type (b) or type (c) may be commencing or ending. When a 0 ending a sequence of type (b) or (c) appears at output terminal $Q_H$ of the shift register 196 FIG. 10E), $x_k$ is 0. Such signal is inverted to 1 by an inverter 236 to form $\bar{x}_k$. Under these conditions, the 0 parity detector 234 counts a 0 upon each $\phi 1$ clock pulse. When the count is even, P(0) is 0. When this occurs at the close of a sequence of 1's at output $Q_H$, it acts to clear the latch 232, to return the encoding to the regular Xerxes encoding from the special circumstances of regular Miller coding of type (c) sequences having less than six 1's. In addition to clearing the latch 232, the 0 parity signal P(0) (FIG. 10P) and its inverse $\overline{P(0)}$, produced at the $\overline{Q}$ output terminal of the 0 parity detector 234, are used for encoding by the circuit of FIG. 9.

A 1 parity detector 238, which may also be a Texas Instruments $J\overline{K}$ flip-flop of type 74109 connected as shown, functions like the parity detector of the $J\overline{K}$ flip-flop 66 to produce a 1 parity signal P(1) (FIG. 10R) at the Q output terminal and its inverse $\overline{P(1)}$ at the $\overline{Q}$ output terminal. The inverse 1 parity signal $\overline{P(1)}$ is used for encoding by the circuit of FIG. 9.

An inverter 240 is used to invert the signal $x_{k+1}$ to provide its inverse $\bar{x}_{k+1}$ for use in encoding by the circuit of FIG. 9.

The encoding circuit of FIG. 9 operates on the signals developed in the circuit of FIG. 8 much as the encoding circuit of FIG. 4. In this case, enabling AND gates 242 and 244 are enabled by $\phi 1$ and $\phi 2$ clock pulses, respectively, at respective, mutually exclusive a and b parts of a bit cell to develop interleaved $a_k$ and $b_k$ signals which are applied through an OR gate 246 to the D input of a D flip-flop 248 where they are successively clocked out by 2F clock pulses (FIG. 10B), making the Q output terminal of the D flip-flop 248 a half bit behind the input at the time of clocking. Hence, the Q output signal is $b_{k-1}$ at the time of encoding $a_k$.

As in the case of the encoder of FIG. 4, 1's are normally encoded according to standard Miller by a mid-cell transition, that is, $b_k$ is 1. The normal encoding is effected by the AND gate 244 which produces a 1 when enabled by a $\phi 2$ clock pulse $x_k$ is 1, provided the third input is also 1. The third input is received from an OR gate 250. This has two inputs, one from an OR gate 252 and the other from an AND gate 254. The OR gate 252 responds to $\overline{P(0)}$ or G to produce a 1 that operates through the OR gate 250 to enable the gate 244. When $\overline{P(0)}$ is 1, the sequence of 1's is of type (a) to be encoded according to the normal Miller format. When G is 1, the sequence of 1's is of type (c) but the sequence is less than six and hence is to be encoded according to standard Miller. The only other time a 1 is to be encoded by a mid-cell transition is when it is the last of a sequence of 1's of type (c). This is detected by the AND gate 254. It occurs when (1) P(0) is 1, signifying a sequence of type (b) or type (c), (2) $\overline{P(1)}$ is 1, signifying an odd 1 is being encoded, and (3) $\overline{x}_{k+1}$ is 1 signifying that the next bit is 0.

Also as in the case of the encoder of FIG. 4, 0's are normally encoded according to standard Miller by an edge-cell transition, that is, $a_k$ is 1. The normal encoding is effected by the AND gate 242 which produces a 1 when enabled by a $\phi 1$ clock pulse and the output of an OR gate 256 is 1. The OR gate 256 produces such 1 output when the output of a NOR gate 258 is 1. The inputs of the NOR gate 258 are the bit signal $x_k$ and the Q output of the D flip-flop 248, such Q output being $b_{k-1}$ at the time of encoding $a_k$. Hence, the output of the NOR gate 258 operates by way of the OR gate 256 to enable the AND gate 242 to encode a 0 by an edge-cell transition $a_k$ when $x_k$ is 0, except when it follows a mid-cell transition encoding a next preceding 1.

According to the Xerxes format, an edge-cell transition is also effected at the beginning of the odd parity 1's of pairs of 1's of sequences of 1's of type (b) or type (c), except in the case where the look-ahead capability is not exceeded and the sequence can be determined at the onset to be of type (c). This encoding is effected by AND gates 260 and 262. The AND gate 260 is enabled by the $\overline{P(1)}$ signal which is 1 when the 1 being encoded is the odd 1 of a pair. The AND gate 262 produces a 1 output only when (1) P(0) is 1, signifying a sequence of type (b) or type (c), (2) $x_k$ and (3) $x_{k+1}$ are both 1's, signifying a pair of successive 1's, and (4) $\overline{G}$ is 1, signifying that it is not a sequence of type (c) within the look-ahead capability. Thus, under these conditions, the 1 output of the AND gate 262 produces a 1 output of the AND gate 260 for the odd 1's. This acts through the AND gate 260, the OR gate 256 and the AND gate 242 to make $a_k$ 1 and hence to produce an edge-cell transition.

The transitions in output signal are produced by a J$\overline{K}$ flip-flop 264, which may be a Texas Instrument J$\overline{K}$ flip-flop of type 74109 connected as shown. The transitions occur upon each 2F clock pulse when the Q output of the D flip-flop 248 is 1, producing an output signal as shown in FIG. 10S. In FIG. 10T is illustrated how the same signal would be encoded according to the Xerxes format when the look-ahead capability is only one. That is the case of the encoder of FIG. 4 and would be the case if the latch 232 of the circuit of FIG. 8 were disabled with G 0 (suppressed). It may be noted that when the look-ahead capability is exceeded (FIG. 10T), there are 2.5 T between transitions, whereas the transitions are otherwise (FIG. 10S) no more than 2 T apart, reducing bandwidth requirements.

As in the case of the encoder of FIG. 4, the various flip-flops and shift registers of the circuits of FIGS. 8 and 9 may be cleared at the outset of encoding by a reset pulse I.

While two specific encoding circuits have been shown and a specific decoding circuit operating on the same code has been discussed, it should be evident that other particular circuitry may be used for the same purposes. Further, other code formats may be used coming within the scope of the present invention. As to 0 parity, it makes little difference whether the controlling parity is even or odd; as imbalance cannot accumulate so long as a predetermined parity state is used for controlling encoding to distinquish sequences of type (a) from those of types (b) and (c). If odd parity were used instead of even parity to identify sequences of types (b) and (c), different sequences would be indentified and encoded by the special Xerxes rule, but the same decoding system would accurately decode to the original data.

In summary, the invention encompasses a method and system wherein a data stream in binary serial form is considered as the concatenation of a plurality of types of sequences, some of which may create a DC imbalance if the code format of Miller U.S. Pat. No. 3,108,261 were used. In accordance with the present invention, there is indicated at the onset of any sequence of 1's whether or not the sequence is of the sort that could introduce DC imbalance. Responsive to this indication remedial action is taken at the onset of the sequence appropriate for eliminating any DC component. Preferably this is achieved by encoding sequences of type (b) or type (c) by providing a single edge-cell transition for the first of each pair of 1's with no transition for the second 1. In one form of the invention, by looking ahead a limited number of states, it may be noted at the onset whether or not a particular sequence of 1's ends within the limit and is of the sort that would not introduce a DC component into the transmission signal with normal Miller transmission, in which event the entire sequence is encoded normally.

What is claimed is:

1. In a self-clocking transmission system for transmitting binary data bits sequentially in successive clocked bit cells of a transmission channel wherein logical first bit states are normally transmitted as signal transitions relatively early in the respective bit cells and logical second bit states are normally transmitted as signal transitions relatively late in the respective bit cells and any transition relatively early in a bit cell following a transition relatively late in the next preceding bit cell is normally suppressed, apparatus for modifying the transmitted signal to remove any net DC component, said apparatus comprising first indicating means responsive to first bit states for counting the number of first bit states and producing at the onset of a sequence of second bit states following a first bit state a first indicating signal when the number of first bit states is of predetermined parity indicating any such sequence that might introduce a DC component into the transmitted signal with normal transmission, second indicating means responsive to bit states for producing a second indicating signal indicating whether the number of second bit states occurring in such sequence prior to a current bit is odd or even, and transition modifying means responsive to said first and second indicating signals and to the current bit and the next succeeding bit for modifying the transmission of signal transitions from the onset of such sequence to eliminate any DC component.

2. Apparatus in accordance with claim 1 wherein said transition modifying means modifies the transmission of signal transitions to provide a single transition corresponding to each pair of second bit states of such sequence where the first of the pair is an odd second bit state, which single transition is transmitted relatively early in the respective bit cell for the first of the pair.

3. Apparatus in accordance with either one of claims 2 and 3 further including decoding means responsive to transmitted signal transitions for indicating the bit states of the binary data transmitted, said decoding means comprising synchronizing means responsive to transmitted signal transitions for providing timing signals identifying bit cell intervals, detection means responsive to said transmitted signal transitions and said timing signals by producing transition identifying signals iden-

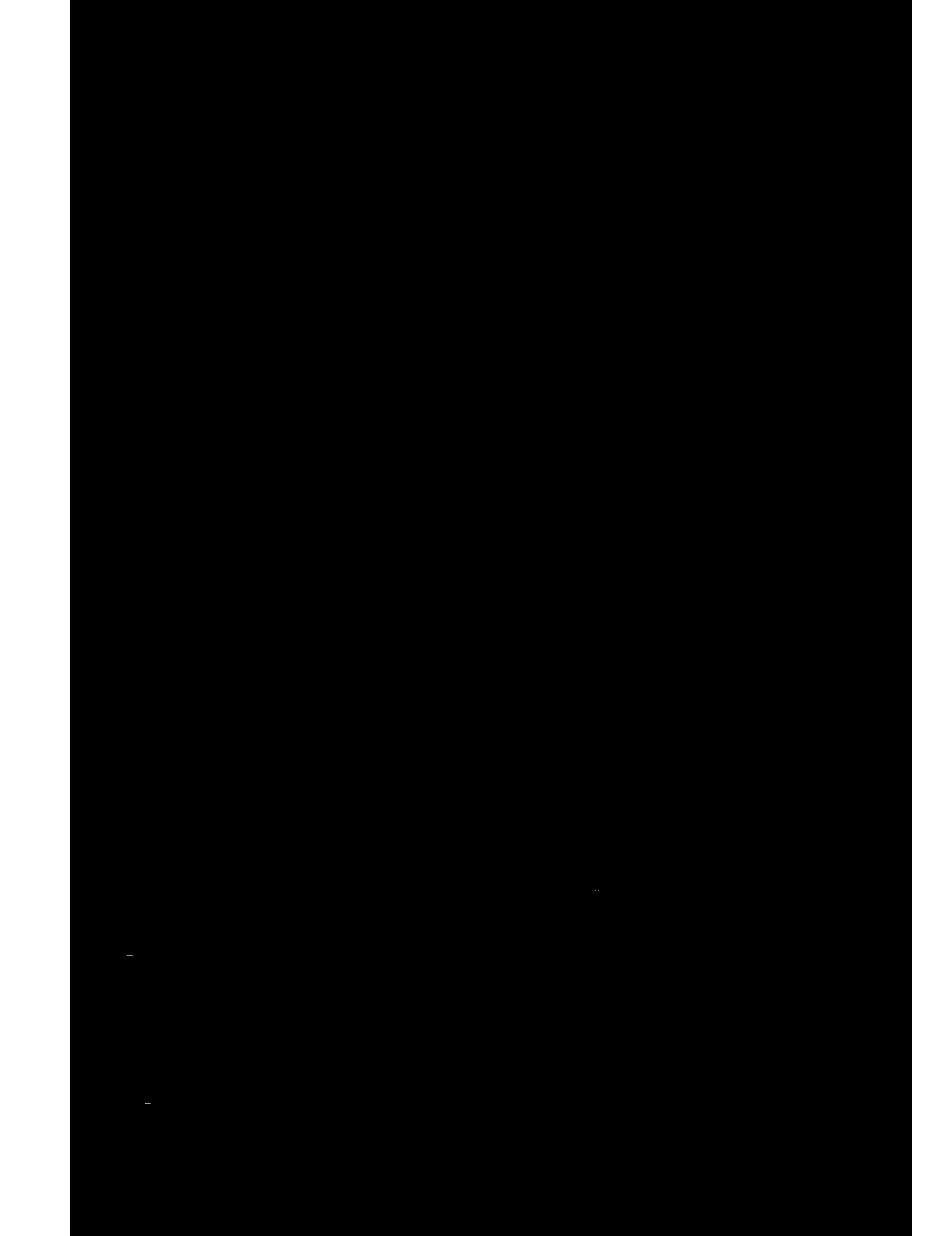

UNITED STATES PATENT AND TRADEMARK OFFICE
CERTIFICATE OF CORRECTION

PATENT NO. : 4,234,897
DATED : November 18, 1980
INVENTOR(S) : Jerry W. Miller

It is certified that error appears in the above—identified patent and that said Letters Patent is hereby corrected as shown below:

Column 23, line 21 (Claim 4), after "any" insert --transition relatively early in a bit cell following a--.

Signed and Sealed this

Twenty-fourth Day of August 1982

|SEAL|

Attest:

GERALD J. MOSSINGHOFF

Attesting Officer     Commissioner of Patents and Trademarks